(12) United States Patent
Tschesnok

(10) Patent No.: US 8,471,848 B2
(45) Date of Patent: Jun. 25, 2013

(54) SYSTEM AND METHOD FOR TRACKING THREE DIMENSIONAL OBJECTS

(75) Inventor: Andrew J. Tschesnok, New Brunswick, NJ (US)

(73) Assignee: Organic Motion, Inc., New York, NY (US)

(*) Notice: Subject to any disclaimer, the term of this patent is extended or adjusted under 35 U.S.C. 154(b) by 929 days.

(21) Appl. No.: 12/208,052

(22) Filed: Sep. 10, 2008

(65) Prior Publication Data

US 2009/0122058 A1 May 14, 2009

Related U.S. Application Data

(63) Continuation-in-part of application No. PCT/US2008/055728, filed on Mar. 3, 2008.

(60) Provisional application No. 60/892,738, filed on Mar. 2, 2007.

(51) Int. Cl.
| | |
|---|---|
| G06T 17/00 | (2006.01) |
| G06T 15/00 | (2011.01) |
| G06T 15/10 | (2011.01) |
| G06T 15/20 | (2011.01) |
| G06K 9/00 | (2006.01) |

(52) U.S. Cl.
USPC .......... 345/420; 345/419; 345/427; 382/103; 382/154

(58) Field of Classification Search
USPC ............... 345/419, 420, 427; 382/103, 154
See application file for complete search history.

(56) References Cited

U.S. PATENT DOCUMENTS

| | | | | |
|---|---|---|---|---|
| 4,962,425 A * | 10/1990 | Rea | | 348/187 |
| 5,579,944 A | 11/1996 | Hafner et al. | | |
| 5,850,352 A * | 12/1998 | Moezzi et al. | | 345/419 |
| 6,081,273 A * | 6/2000 | Weng et al. | | 345/420 |
| 6,104,864 A * | 8/2000 | Kondo et al. | | 386/227 |
| 6,173,066 B1 | 1/2001 | Peurach et al. | | |
| 6,256,036 B1 * | 7/2001 | Matsumoto | | 345/419 |
| 6,363,169 B1 * | 3/2002 | Ritter et al. | | 382/154 |
| 6,661,918 B1 * | 12/2003 | Gordon et al. | | 382/173 |

(Continued)

FOREIGN PATENT DOCUMENTS

| | | |
|---|---|---|
| JP | 10-054709 A | 2/1998 |
| JP | 11-144061 A | 5/1999 |
| JP | 2002-022444 A | 1/2002 |
| JP | 2002-259474 A | 9/2002 |

OTHER PUBLICATIONS

Chien et al., "Identification of 3D Objects from Multiple Silhouettes Using Quadtrees/Octrees," *Computer Vision Graphics and Image Processing* 36, 256-273 (1986).

(Continued)

*Primary Examiner* — David T Welch
(74) *Attorney, Agent, or Firm* — Arnold & Porter LLP

(57) ABSTRACT

Embodiments of the invention are directed to improved systems and methods for three dimensional (3D) image reconstruction. The systems and methods are directed to extracting, digitally reconstructing and optionally tracking 3D objects from multiple two dimensional (2D) video camera sources. The systems and methods are directed to reconstructing a 3D scene via 2D cameras and then re-projecting this data back onto 2D surfaces. This system and method can greatly simplify the image processing required to analyze the 3D model by moving the analysis techniques back into the 2D domain.

10 Claims, 22 Drawing Sheets

U.S. PATENT DOCUMENTS

| | | | | |
|---|---|---|---|---|
| 6,751,344 | B1* | 6/2004 | Grumbine | 382/154 |
| 6,768,509 | B1* | 7/2004 | Bradski et al. | 348/207.99 |
| 7,058,204 | B2 | 6/2006 | Hildreth et al. | |
| 7,127,362 | B2 | 10/2006 | Mundt | |
| 7,257,237 | B1 | 8/2007 | Luck et al. | |
| 7,403,202 | B1* | 7/2008 | Nash | 345/474 |
| 2002/0050988 | A1* | 5/2002 | Petrov et al. | 345/418 |
| 2002/0080135 | A1* | 6/2002 | Sakakibara | 345/419 |
| 2003/0202691 | A1* | 10/2003 | Beardsley | 382/154 |
| 2004/0119716 | A1* | 6/2004 | Park et al. | 345/473 |
| 2004/0155962 | A1* | 8/2004 | Marks | 348/169 |
| 2005/0078178 | A1* | 4/2005 | Brown et al. | 348/139 |
| 2006/0066612 | A1* | 3/2006 | Yang et al. | 345/419 |
| 2006/0087508 | A1* | 4/2006 | Drexler et al. | 345/427 |
| 2007/0183669 | A1* | 8/2007 | Owechko et al. | 382/224 |
| 2007/0279494 | A1* | 12/2007 | Aman et al. | 348/169 |
| 2008/0001951 | A1* | 1/2008 | Marks et al. | 345/474 |
| 2008/0130015 | A1* | 6/2008 | Lu | 356/610 |

OTHER PUBLICATIONS

Fitzgibbon et al., "Automatic 3D Model Construction for Turntable Sequences," *Proceedings of the European Workshop on 3D Structure from Multiple Images of Large-Scale Environments (SMILE '98)*, LNCS 1506:155-170 (1998).

International Search Report from PCT/US08/55728 dated Jul. 30, 2008.

Martin et al., "Volumetric Descriptions of Objects from Multiple Views," *IEEE Transactions on Pattern Analysis and Machine Intelligence*, 5(2):150-158 (1983).

Niem, "Robust and Fast Modeling of 3D Natural Objects from Multiple Views," *Proceedings 'Image and Video Processing II'*, 2182:388-397 (1994).

Potmesil, "Generating octree models of 3D objects from their silhouettes in a sequence of images," *Computer Vision, Graphics and Image Processing* 40:1-29 (1987).

Segal et al., "Fast shadows and lighting effects using texture mapping," *SIGGRAPH Comput. Graph*. 26(2):249-252 (1992).

Szeliski, "Rapid octree constructions from image sequences," *CYGIP: Image Understanding* 58(1):23-32 (1993).

Hasenfratz et al., "A Real-Time System for Full Body Interaction with Virtual Worlds," *Eurographics Symposium in Virtual Environments*, 10 pages (2004).

Supplementary European Search Report completed on Oct. 8, 2012, in European Patent Application No. 08731302.9.

Wu et al., "Real-Time Active 3D Shape Reconstruction for 3D Video," *Proceedings of the 3rd International Symposium on Image and Signal Processing and Analysis*, 1:186-191 (2003).

\* cited by examiner

POSITION OF ARM CAN BE EASILY CALCULATED

VS

WE USE THE SIDE OF THE ARM AND ITS PREVIOUS LOCATION TO KEEP TRACK OF ITS POSITION EVEN AS PART OF LARGE OBJECTS

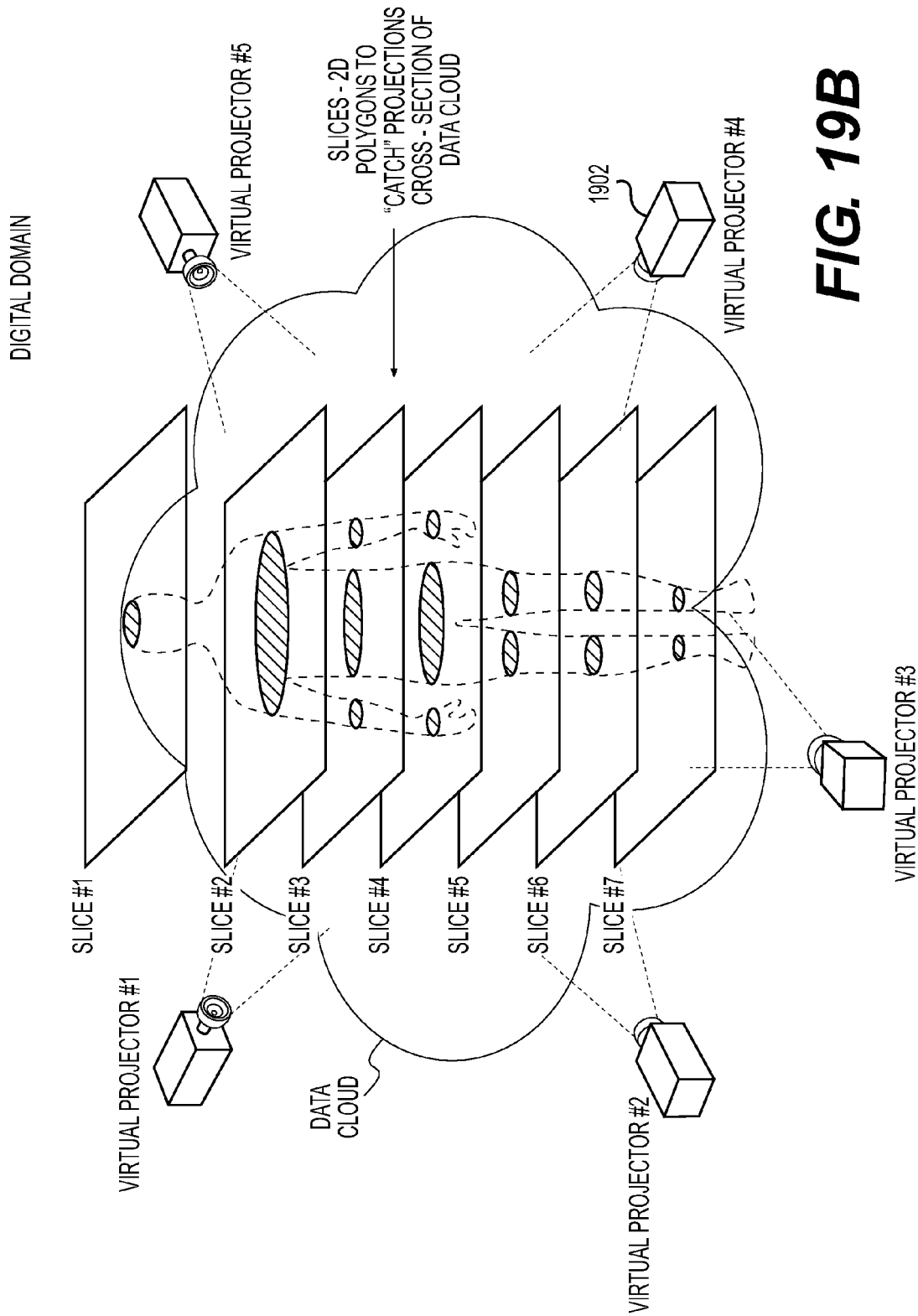

SYSTEM AND METHOD FOR TRACKING THREE DIMENSIONAL OBJECTS

CROSS-REFERENCE TO RELATED APPLICATION

This application is a continuation-in-part of International application PCT/US2008/055728, filed Mar. 3, 2008, which claims the benefit of U.S. Provisional Patent Application No. 60/892,738, filed Mar. 2, 2007, both of which contents are hereby incorporated by reference herein.

BACKGROUND OF THE INVENTION

1. Field of the Invention

Embodiments of the invention relate to computer vision and three-dimensional (3D) image reconstruction.

2. Description of the Related Art

Over the past twenty years many well documented techniques have been developed in the field of computer vision to try to reconstruct, digitize and track objects in 3D. One such technique is the reconstruction of objects from multiple two-dimensional (2D) outline images captured of this object. This technique typically makes use of a 3D volume of voxels which are carved using the 2D outline images from varying viewpoints. This technique has been effectively used to generate voxel volumes that represent the general 3D shape of the object being reconstructed.

Several algorithms have been published for the computation of the visual hull, including, for example: W. Martin and J. K. Aggarwal, "Volumetric descriptions of objects from multiple views," IEEE Transactions on Pattern Analysis and Machine Intelligence, vol. 5, no. 2, pp. 150-158, March 1983; M. Potmesil, "Generating octree models of 3D objects from their silhouettes in a sequence of images," Computer Vision, Graphics and Image Processing, vol. 40, pp. 1-29, 1987; Richard Szeliski, "Rapid octree construction from image sequences," CYGIP: Image Understanding, vol., 58; no. 1, pp, 23-32, July 1993; and W. Niem, "Robust and Fast Modeling of 3D Natural Objects from Multiple Views", Proceedings "Image and Video Processing II", Vol. 2182. pp. 388-397 (1994). The contents of these documents are hereby incorporated by reference herein.

These approaches attempt to solve the problem in a volumetric space representation. The most common of these representations is to subdivide a 3D box into a set of voxels of discrete size. The size of the box is predetermined so that the object can be contained by it. To improve performance these may be represented as "octrees" or are run-length encoded.

Further related information can be found in: C. H. Chien and J. K. Aggarwal, "Identification of 3D Objects from Multiple Silhouettes Using Quadtrees/Octrees", Computer Vision Graphics And Image Processing 36, pp. 256-273 (1986); and A. W. Fitzgibbon, G. Cross and A. Zissermann, "Automatic 3D Model Construction for Turntable Sequences", Proceedings of the European Workshop on 3D Structure from Multiple images of Large-scale Environments (SMILE '98), LNCS 1506, pp. 155-170 (1998). The contents of these documents are hereby incorporated by reference herein.

The problem with traditional space carving techniques is one of performance and flexibility. By predefining a 3D grid of voxels, computer resources are quickly depleted. Real-time performance has only been possible with greatly reduced resolutions involving as few as 1 million voxels representing a 100×100×100 low-resolution grid. Many techniques have been developed to try to optimize this approach using space subdivisions and other optimizations. These techniques have helped but have not made a voxel-based approach a real-time practicality. U.S. Pat. No. 7,127,362 describes one such approach. The contents of this patent are hereby incorporated by reference herein.

After image reconstruction using the above techniques, researchers have often used various techniques of analyzing and tracking the objects. Analyzing voxel grids has proven to be very time-intensive. One technique of tracking a human figure represented by a voxel grid has been described in U.S. Pat. No. 7,257,237. The contents of this patent are hereby incorporated by reference herein.

Accordingly, there exists a need in the art for improved systems and methods for 3D image reconstruction.

SUMMARY OF THE INVENTION

The present invention addresses these and other needs by providing improved systems and methods for 3D image reconstruction.

The new systems and methods of image reconstruction described herein avoid the use of voxels. They address both the performance and resolution problems inherent in voxel-based reconstruction approaches, as well as the performance problems related to analyzing and tracking a voxel shape once it has been reconstructed.

Methods of the present invention have been developed for extracting, digitally reconstructing and tracking 3D objects from multiple 2D video camera sources. These methods particularly lend themselves to high-speed detection and tracking of complex organic shapes, such as animals and the human body. The present invention successfully achieves a real-time, marker-less motion capture system which no longer requires subjects to use markers or attached tracking devices.

The present invention describes a novel approach to reconstructing a 3D scene via 2D cameras and then re-projecting this data back onto 2D surfaces. This method greatly simplifies the image processing required to analyze the ID model by moving the analysis techniques back into the 2D domain.

In addition to providing a novel new approach of digitally reconstruction 3D scenes, the present invention provides a unique approach of leveraging and repurposing graphics card hardware first developed for the video game industry. Repurposing this hardware using the methods described herein can accelerate 3D scene reconstruction hundreds of times faster than conventional CPU-driven approaches.

BRIEF DESCRIPTION OF THE DRAWINGS

Objects and advantages of the invention will become apparent upon consideration of the following detailed description, taken in conjunction with the accompanying drawings, in which like reference characters refer to like parts throughout, and in which.

It is to be understood that the above-mentioned drawing figures are provided solely to assist in describing the concepts of the present invention and may not be to scale, and are certainly not intended to be limiting in terms of the range of possible shapes and proportions well within the scope of embodiments of the invention.

DETAILED DESCRIPTION

The present invention discloses both methods and systems for creating 3D representations of target objects in a 3D digital domain, and optionally tracking target objects in a 3D digital domain.

Figure 21:
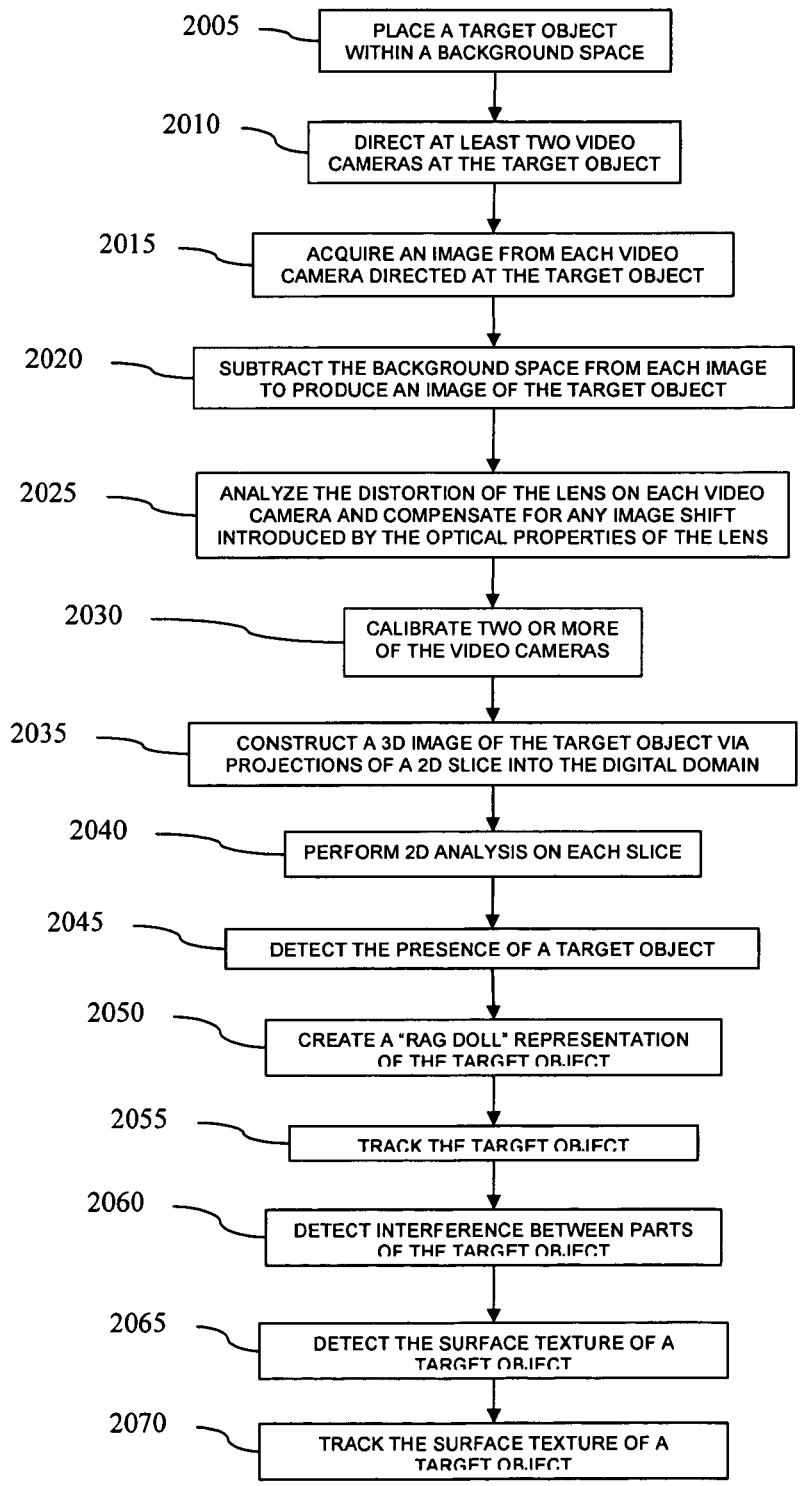
FIG. 21 shows an exemplary method in accordance with certain embodiments of the present invention.

In accordance with certain aspects of the invention, e.g., with reference to FIG. 21, the method may generally include placing a target image in a background space 2005, directing at least two video cameras at the target object 2010, and acquiring an image from each video camera directed at the target object 2015. Moving on, at step 2020, image processing techniques are performed, as generally understood by those of skill in the art, to subtract the background space of the image, to leave only an image of the target object, followed by camera calibration. In certain embodiments, camera calibration may comprise internal camera calibration, e.g., including analyzing the distortion of the video camera lenses, to compensate for the image shifts introduced by the optical properties of the lens at step 2025, as well as relative positional calibration, e.g., calibration of the relative positions of the cameras to each other at step 2030.

Following camera calibration, at step 2035, a 3D image of the target object is reconstructed. In certain non-limiting examples, as described further herein, the 3D image may be reconstructed via projections onto 2D "slices" in a virtual, 3D digital domain. Then, reconstruction may continue, and conventional 2D image analysis may be performed on each slice in the 3D domain 2040. In certain aspects, the steps of the invention may be performed sequentially as outlined above, beginning with step 2020 through to step 2040, or any of steps 2020 through 2040 may be performed simultaneously performed, as described in further detail herein. For instance, image acquisition, internal camera calibration and background subtraction may be performed simultaneously, or any combination thereof.

In certain embodiments, 3D image reconstruction may further comprise detecting the presence of a particular type of target based on the known characteristics of that particular target (optional step 2045), and creating a "rag doll" virtual representation of the target object (optional step 2050). In addition, the methods of the invention may also comprise, in certain aspects, optionally tracking the target object 2055, and additional steps can be followed to determine whether there is interference between parts of the same target object 2060. Finally, in certain embodiments, the method may also include optionally detecting 2065 and tracking 2070 the surface texture of the target object, if desired, as described in further detail herein.

Yet other aspects of the invention provide systems for creating and optionally tracking target objects in 3D. In certain embodiments, the systems of the invention include at least two video cameras directed at a target object located within a background space, and one or more video camera image acquisition modules, such that one or more video cameras are coupled to each image acquisition module, and configured such that each image acquisition module receives images transferred from each camera coupled thereto. The system may further include a processor-based device comprising, e.g., a direct memory access (DMA) controller and a graphics processing unit (GPU), which receives images transferred from each image acquisition module. The systems are then configured to perform the methods as described in more detail herein.

Figure 11:
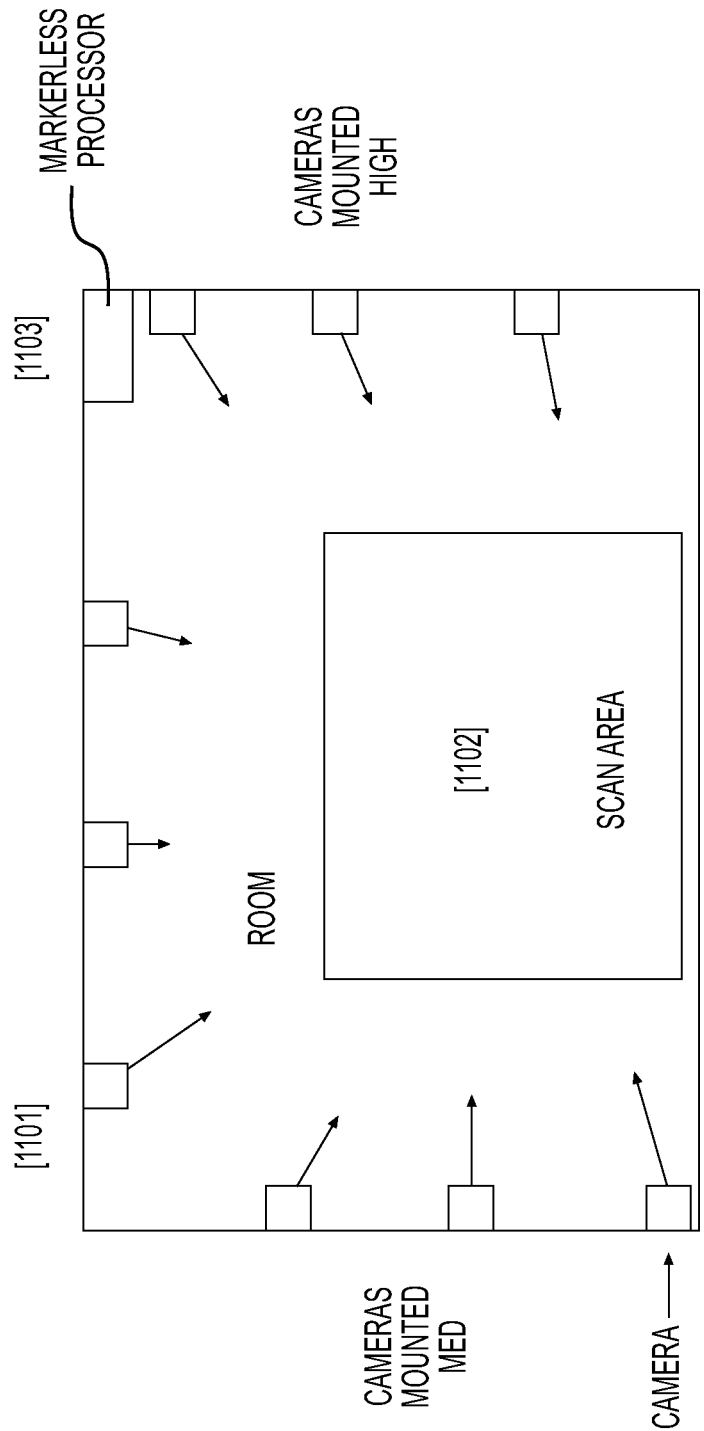
FIG. 11 shows a layout depicting how the real world relates to a digital domain and how cameras relate to virtual projectors.

In a preferred embodiment of the invention, the system includes at least two, three, four, five, six, seven, eight, nine, ten or more digital video cameras. In alternative embodiments, more or fewer video cameras may be used. In other alternative embodiments, one or more analog video cameras may be used. In yet other alternative embodiments, black-and-white video cameras or color video cameras may be used. As shown in FIG. 11, each of the one or more video cameras 1101 are oriented around the target object so as to provide the maximum number of unique perspectives available with such a number of video cameras 1101.

Figure 18:
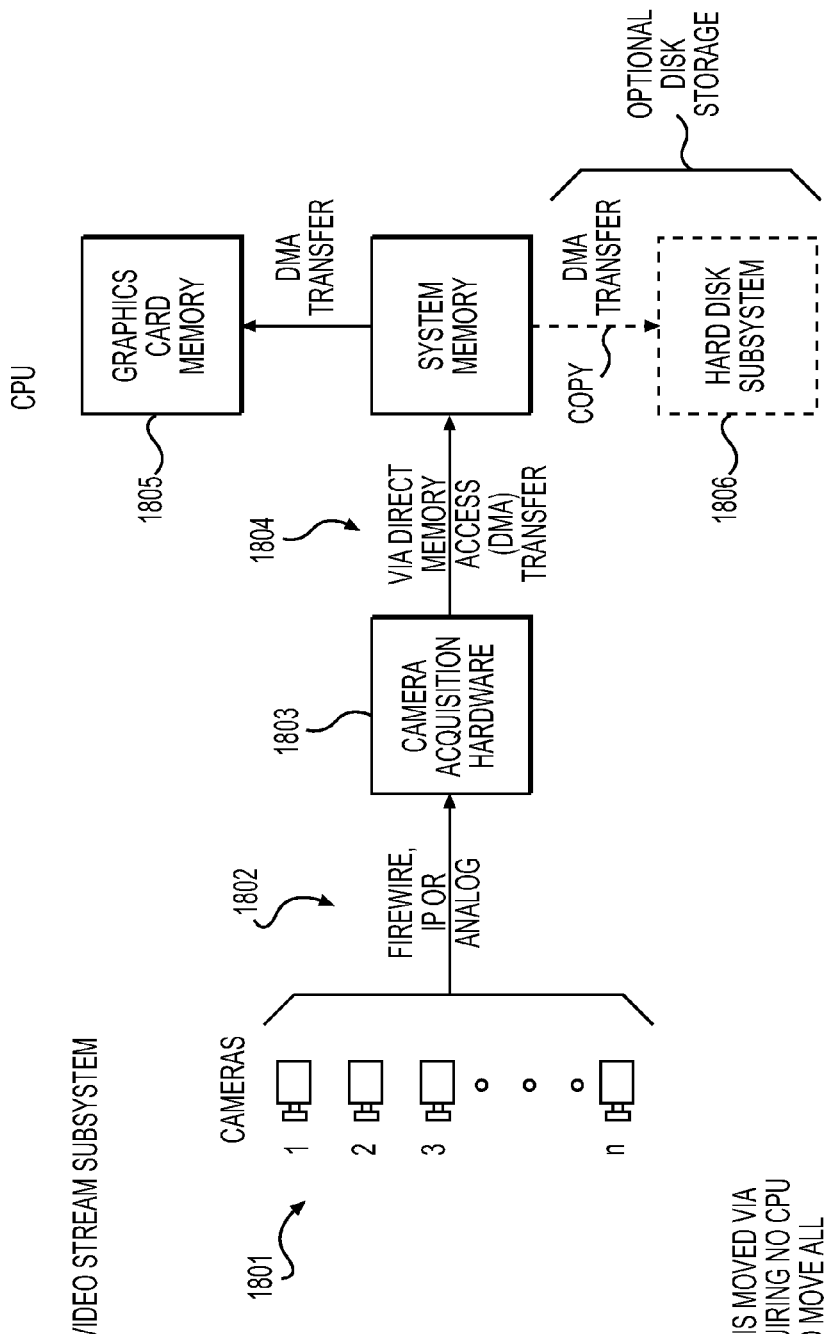
FIG. 18 depicts the flow of data in an exemplary system.

The system of the invention may further include one or more image acquisition modules. As shown in FIG. 18, each image acquisition module 1803 is configured such that it receives images acquired from each of the one or more video cameras 1801. These images may be received by the video camera image acquisition modules 1803 by any transferring mechanism 1802 known in the art, such as, for example, Firewire, Ethernet, wireless protocols, and analog cable.

The system of the invention may further include a processor-based device, such as a computer, comprising, e.g., a DMA controller and optionally a GPU 1805. The processor-based device receives images from the image acquisition modules 1803 which are directly transferred to the GPU 1805. In a primary embodiment of the invention, the GPU 1805 may be a DIRECTX™-capable consumer grade 3D graphics card capable of running vertex and pixel shaders. In one such embodiment, the GPU 1805 is a RADEON™ 9700 Graphics Processor or similar processor as known in the art. The images may be transferred to the GPU by any transferring mechanism 1804 known in the art, such as a DMA transfer.

DMA transfers may be advantageous over alternative mechanisms as they can free up the central processing unit of the processor-based device for other tasks.

Image Acquisition

As mentioned above, the systems and method of the invention first involve placing a target object in a background space, e.g., 2005 with reference to FIG. 21. The background space may range from an empty room to an outdoor area—it is simply the 3D real space in which the target object will be placed. Unless otherwise indicated, where the description herein generally refers to the method steps of the invention, it is understood that the systems and system components referenced are envisioned as relating to the configuration of the systems of the invention as well, and that the systems may be configured to perform such method steps, as understood by those skilled in the art.

With the target object in the background space, the methods of the invention may include directing at least two video cameras at the target object 2010, and acquiring an image from each video camera directed at the target object 2015. In a preferred embodiment of the invention, the method includes directing at least two, three, four, five, six, seven, eight, nine, ten or more digital video cameras at the target object, and acquiring a digital image from each of the digital video cameras. In alternative embodiments, more or fewer video cameras may be used. In other alternative embodiments, one or more analog video cameras may be used. In yet other alternative embodiments, black-and-white video cameras or color video cameras may be used. As shown in FIG. 11, each of the one or more video cameras are oriented around the target object so as to provide the maximum number of unique perspectives available with such a number of video cameras. The method may also include copying the images and transferring the images to a hard disk array 1806 for later retrieval.

Background Subtraction

Following or concurrently with image acquisition, the methods may further include performing image processing techniques to subtract the background space of the image, thereby leaving only an image of the target object 2020. Alternatively, background subtraction may be performed following or concurrently with image reconstruction and/or elements of camera calibration, as described in further detail below. Such image processing techniques may depend on whether black-and-white or color video cameras are used. In one embodiment of the invention, wherein at least one of the video cameras is black-and-white, subtraction of the background space may be performed by placing an active background, such as a backlit sheet or a reflective surface, in the background space. If a reflective surface is used, lights can be placed around the one or more camera lenses to cause the active background to appear to glow.

Figure 1:
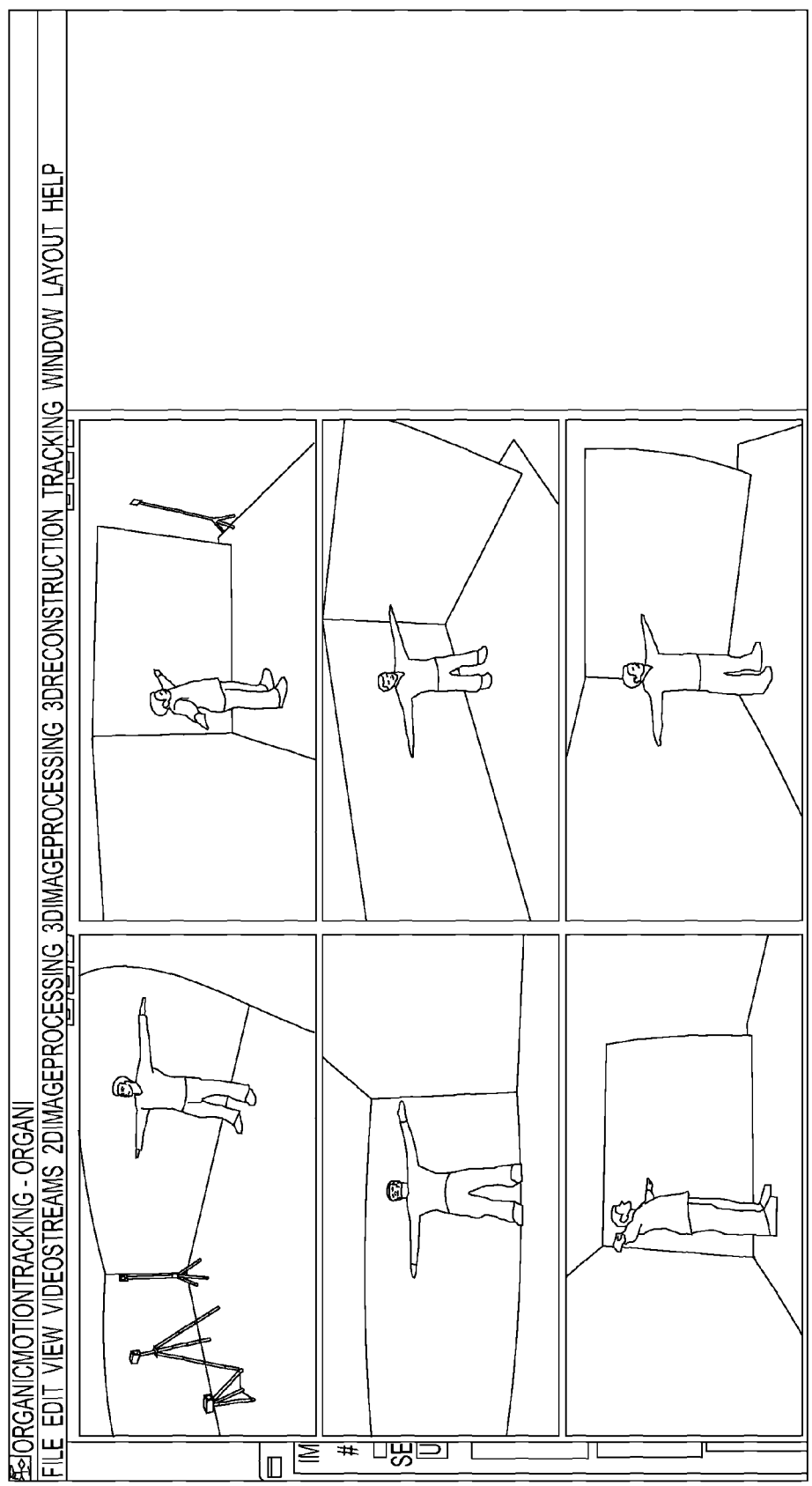
FIG. 1 depicts views of video from 6 cameras surrounding the subject.
Figure 2:
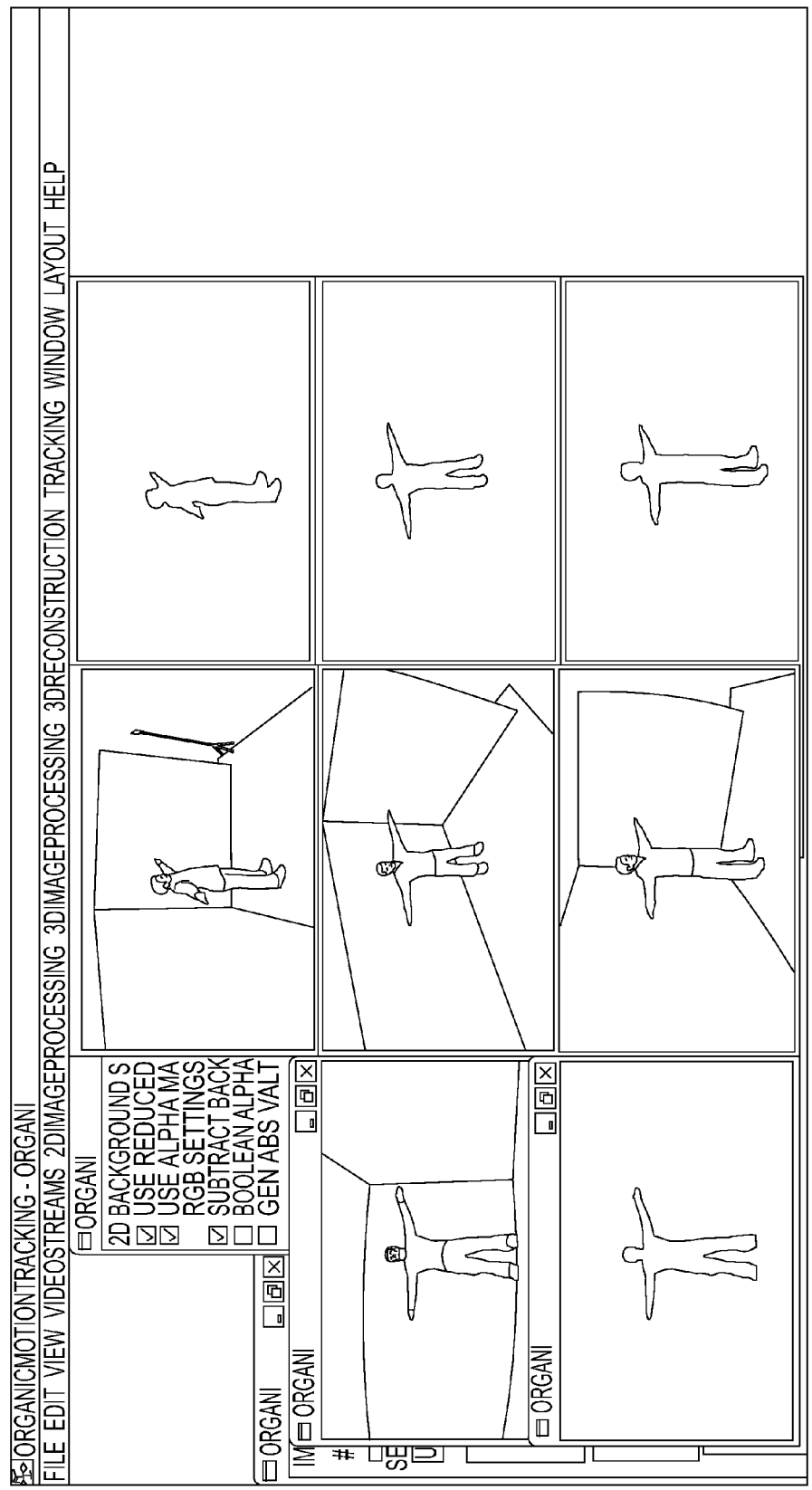
FIG. 2 depicts video views showing background subtraction information.
Figure 3:
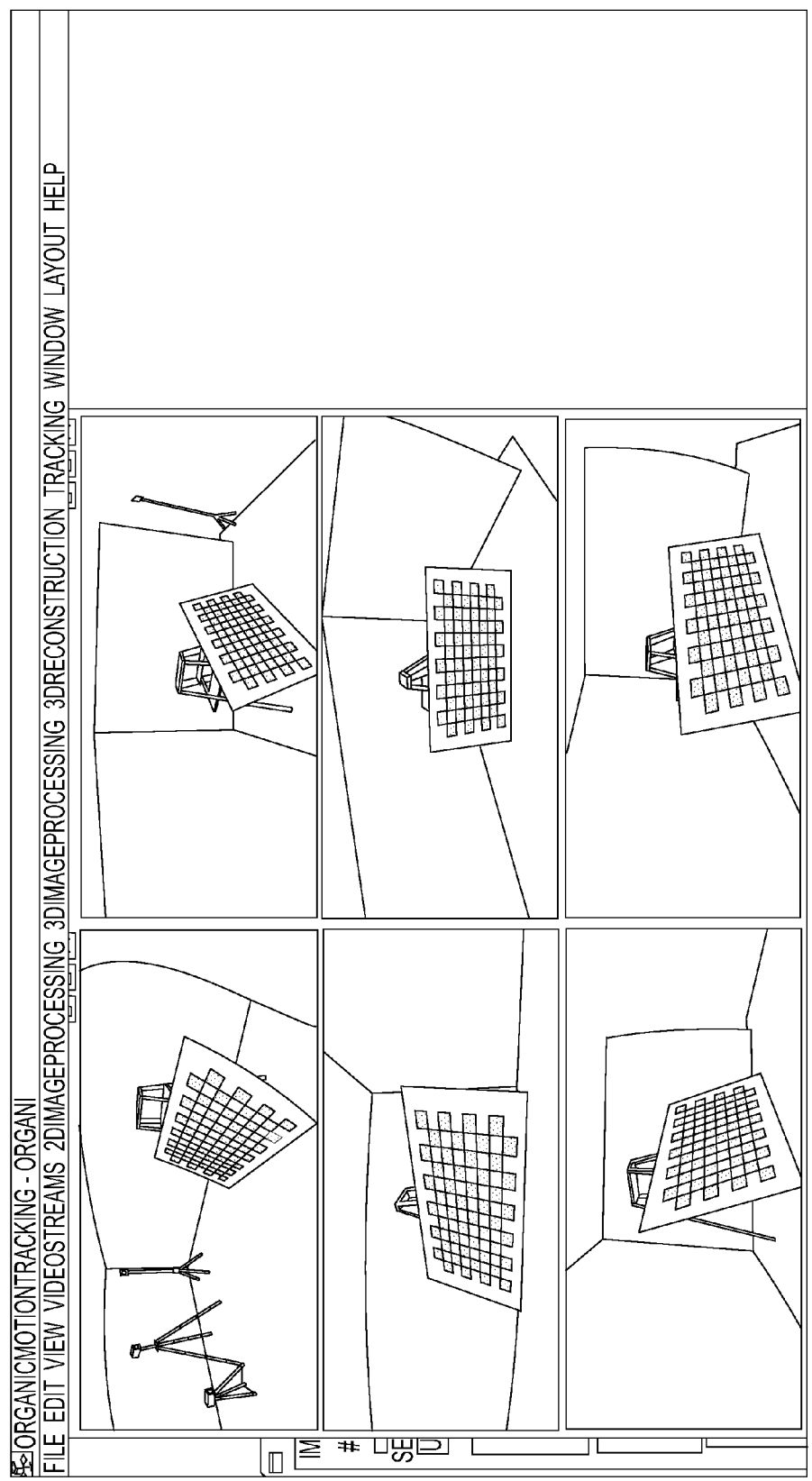
FIG. 3 depicts a video view of cameras looking at large calibration board.

In one embodiment of this invention, the reflective surface may be 3M's "ScotchLite" product. As a consequence of this "glowing" background, even the lightest texture of image of the target will appear darker than the active background. Each pixel that is brighter than a predetermined threshold value can be characterized as a "background pixel", and each pixel that is less bright than the predetermined threshold value can be characterized as a "foreground pixel". All of the foreground pixels, taken together, comprise an image of only the target object. An example of such subtraction can be see in FIG. 2. Use of an active background can eliminate complexities in image segmentation that are introduced by changes in ambient lighting or shadows as the target moves, because the backlighting can eliminates or wash out shadows. However, this approach may require a dedicated studio setup with active or special reflective surfaces placed around the target.

In an alternative embodiment of the invention, wherein at least one of the video cameras is black-and-white, subtraction of the background may be performed by capturing an image of the background prior to placement of the target within the background, which image can be used as a reference image (the "background image"). Upon placement of the target within the background, and the securing of an image including the target (the "foreground image"), a pixel-per-pixel subtraction can be performed between the background image and the foreground image. Anything remaining of the foreground image following the subtraction is considered to be the target.

In yet another alternative embodiment of the invention, wherein at least one of the video cameras is a color video camera, subtraction of the background may be performed by capturing an image of the background prior to placement of the target within the background, which image can be used as a reference image (the "background image"). The background image is converted from standard red-green-blue (RGB) pixelation to a hue-luminosity-saturation (HLS) color-space. The target is placed within the background, an image including the target is secured (the "foreground image") and similarly converted to the HLS color-space. The following rules can be used to locate the object within the foreground image:

a. If a pixel in the foreground image (the "foreground pixel") is lighter in saturation than the corresponding pixel in the background image (the "background pixel") then it is considered part of the target;

b. If the foreground pixel is darker in saturation than the background pixel it may be part of the target, or it could be part of the background which has a shadow on it. If the hue value of the foreground pixel is within a predetermined range of the background pixel, and the difference in saturation and luminance between each pixel is not outside a predetermined range, the pixel is considered part of the background which has been affected by a shadow;

c. If the foreground pixel is outside a predetermined range from the background pixel in hue value, regardless of saturation and luminance, it is considered part of the target; and/or d. If foreground and background differ in color saturation beyond a specific range, then difference is clipped and the background is called the foreground to determine a difference in pixel threshold.

This approach can withstand a variety of lighting changes, in both indoor and outdoor settings, without the need for a dedicated studio setting.

In yet another embodiment of the invention, wherein at least one of the video cameras is a color video camera, subtraction of the background may be performed by using region-based techniques which analyze changes in gradients in the background versus the foreground. In still other embodiments of the invention, subtraction of the background may be performed by combining one or more of the techniques described herein with any of the other techniques described herein, or alternative image processing techniques known to those skilled in the art.

Calibration

Following, or concurrently with background processing/image acquisition, the methods may include steps of camera calibration. In a first aspect, as is generally known to those in the art, the lenses on video cameras can distort images, such that straight lines tend to curve around the edges of the lens. This is seen most clearly when looking through a fisheye or wide angle lens. The method of the present invention may include internal camera calibration, e.g., including analyzing the distortion of the lens on each video camera, and compensating for the image shifts introduced by the optical properties of the lens 2025. The distortion caused by a particular lens can be analyzed by calculating certain properties of the lens, including the exact focal point of the lens (both across the diameter of the lens and through the depth of the lens), the center-point of the lens relative to the image sensor, and the extent to which the lens may be skewed relative to the image sensor.

In one embodiment of the invention these calculations may be performed by placing a checkerboard pattern such that the video camera can acquire one or more images of the checkerboard pattern from various angles. In a primary embodiment of the invention, the video camera will acquire at least thirty images of the checkerboard pattern from different angles. Standard image processing techniques, as understood by those skilled in the art, can be used to calculate the intersection points of all squares on the checkerboard, and to use those intersection points to calculate the lens parameters.

The method of the invention may further include the relative external calibration of two or more video cameras located around the target with respect to each other 2030. In one embodiment of the invention, the location of the video cameras may be calibrated by placing a checkerboard pattern such that each video camera can capture an image of the checkerboard pattern. Each video camera captures an image and detects the squares of the checkerboard and each intersection point. Standard image processing techniques can be used to calculate the intersection points of all squares on the checkerboard, and to use those intersection points to calculate the camera positions.

Figure 12:
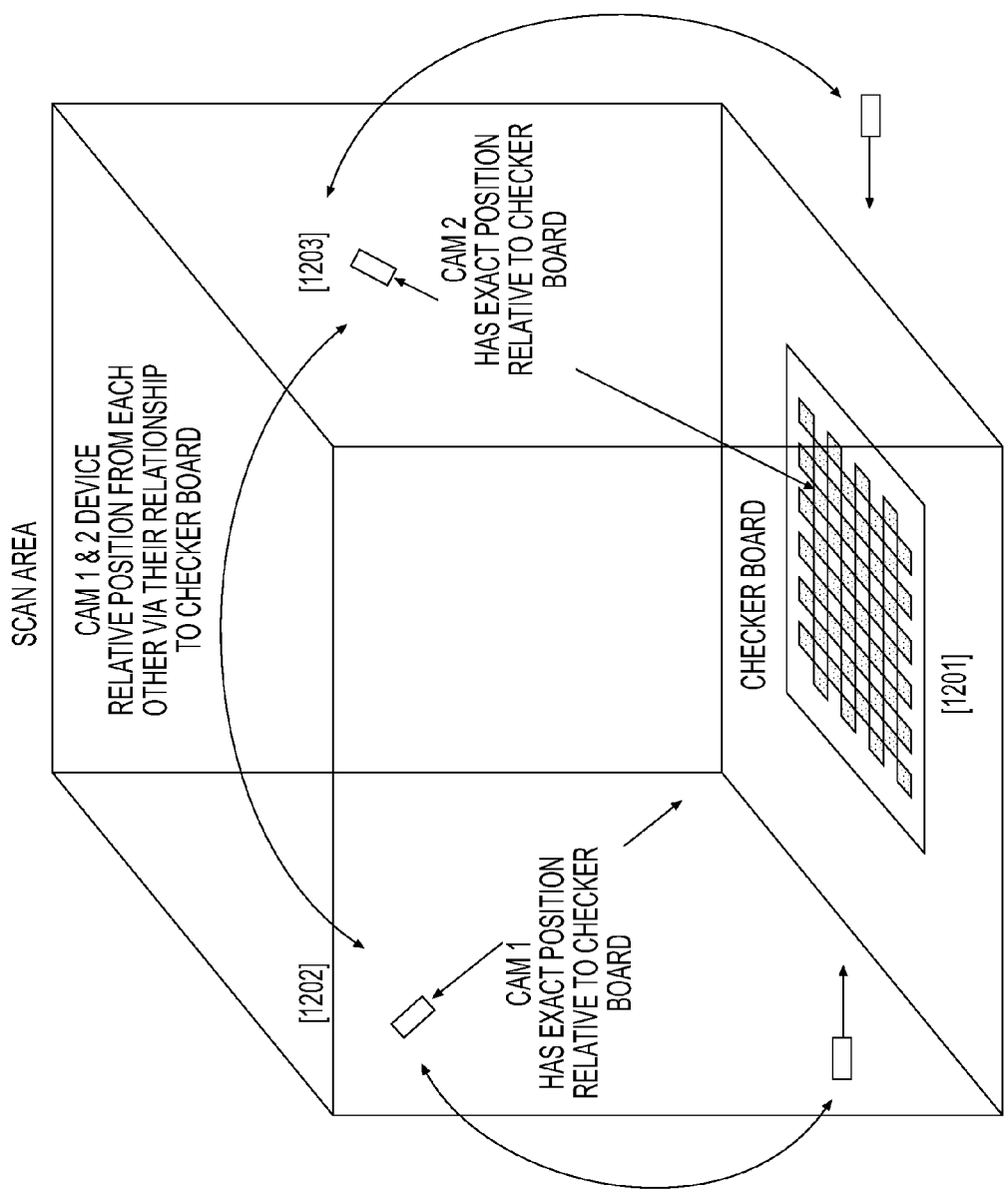
FIG. 12 shows how camera space calibration is setup.
Figure 13:
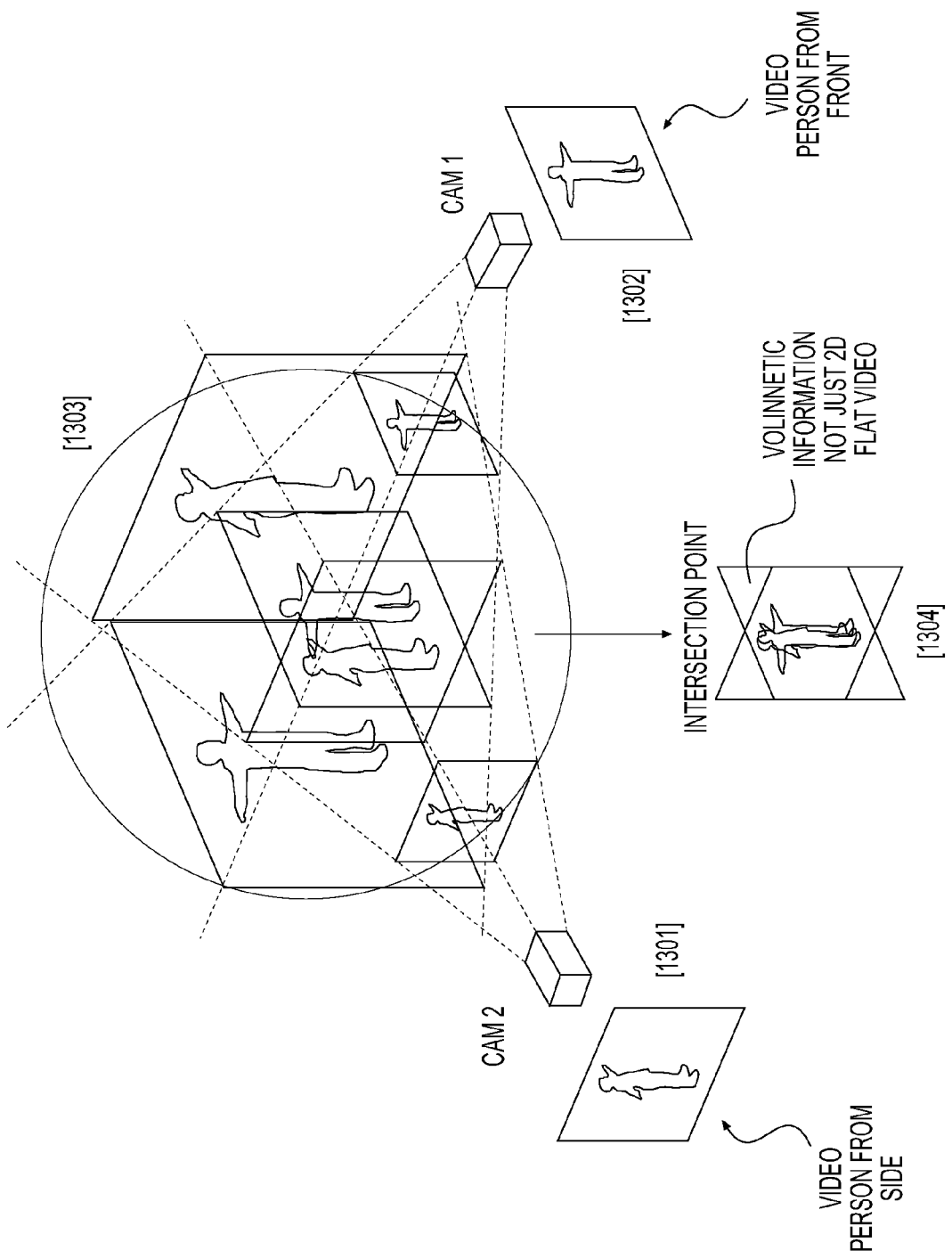
FIG. 13 shows a virtual projection cloud of intersecting camera projections.
Figure 14:
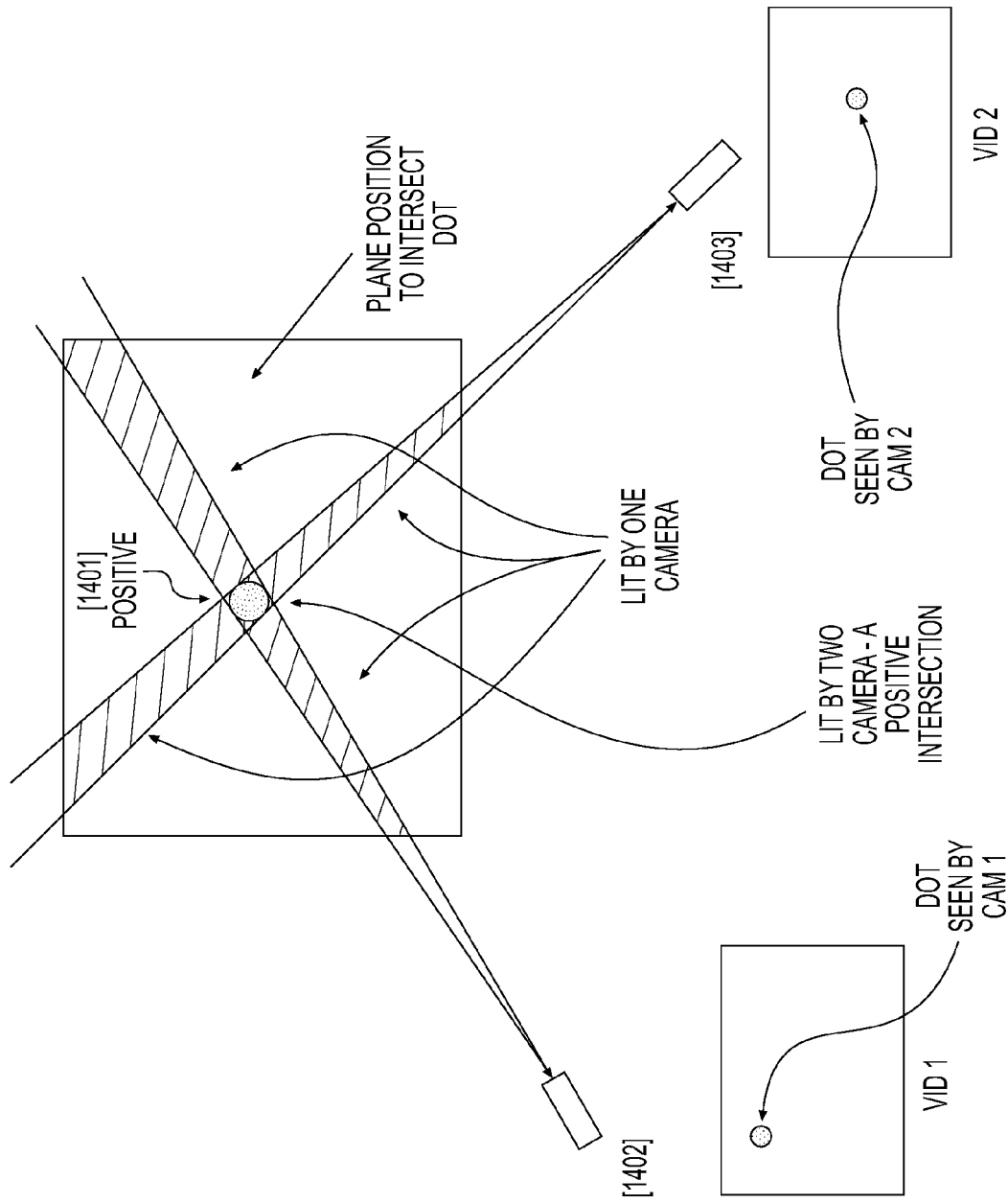
FIG. 14 shows how data from camera projections are "Drawn" onto a 2D Polygon.

As seen in FIG. 12, in a preferred embodiment of the invention, the accuracy of the foregoing checkerboard method can be improved by capturing at least 100 images from each camera simultaneously, and building a map of positional relationships between all cameras based on each camera's relative position to the board. The checkerboard is placed on the floor, and the position of one camera is calculated with respect to the checkerboard. The top left square on the checkerboard on the floor becomes the X and Y origin point of the scan space and the up vector (coming out of the board) becomes the Z vector. Since the relationship is known between each camera and every other camera, the camera that can best capture an image of the board will orient the grid of cameras relative to the origin point in both position and orientation. Now every camera's position is known relative to the board's origin point. This method can be further improved by taking the standard deviation and removing outliers from the calculation from each checkerboard calculation.

In certain embodiments, it may be preferred to perform relative camera calibration prior to initiation of image acquisition, concurrently with image acquisition/background processing, following image acquisition, or concurrently with image reconstruction, as described in further detail below. However, efficiency may be improved by performing relative external camera calibration prior to initiation of image acquisition, e.g., upon configuring the background space with the desired number of cameras.

Image Reconstruction

Following image acquisition, processing, and calibration, the method may include reconstructing a 3D image of the target object. In certain embodiments, reconstruction may generally comprise construction via projections into a virtual, 3D digital domain 2035. By way of non-limiting example, the captured image feed from each video camera is projected into the exact direction, and from the exact position, of the actual camera with the exact lens properties of the actual camera. By way of analogy only, these projections can be thought of as produced by virtual projectors placed in the same configuration relative to one another as the one or more video cameras. This reconstruction process is a reversal of what is happening in the real world: In the real world, light reflected from the target object emanates from the object into the one or more video cameras. During the reconstruction process in the digital domain, the captured images themselves project the light from the cameras into the simulated room. As each of the video cameras have been properly calibrated by position and specific lens properties, the projected images intersect in the 3D digital domain in exactly the same way they had emanated from the target in the real world.

In one embodiment of the invention, the 2D images captured by the video cameras may be projected using standard 3D projection techniques. Such standard 3D projection techniques are well known in the art of 3D computer graphics, and often are used to project shadows or light sources onto 2D polygon textures using DirectX DIRECTX™ or OpenGL. The following publication gives a good background to the art: Mark Segal and Carl Korobkin and Rolf van Widenfelt and Jim Foran and Paul Haeberli, "Fast shadows and lighting effects using texture mapping," SIGGRAPH Comput. Graph. vol. 26, no. 2, 1992, issn., 0097-8930, pp. 249-252. The contents of this document is hereby incorporated by reference herein.

Figure 19A:
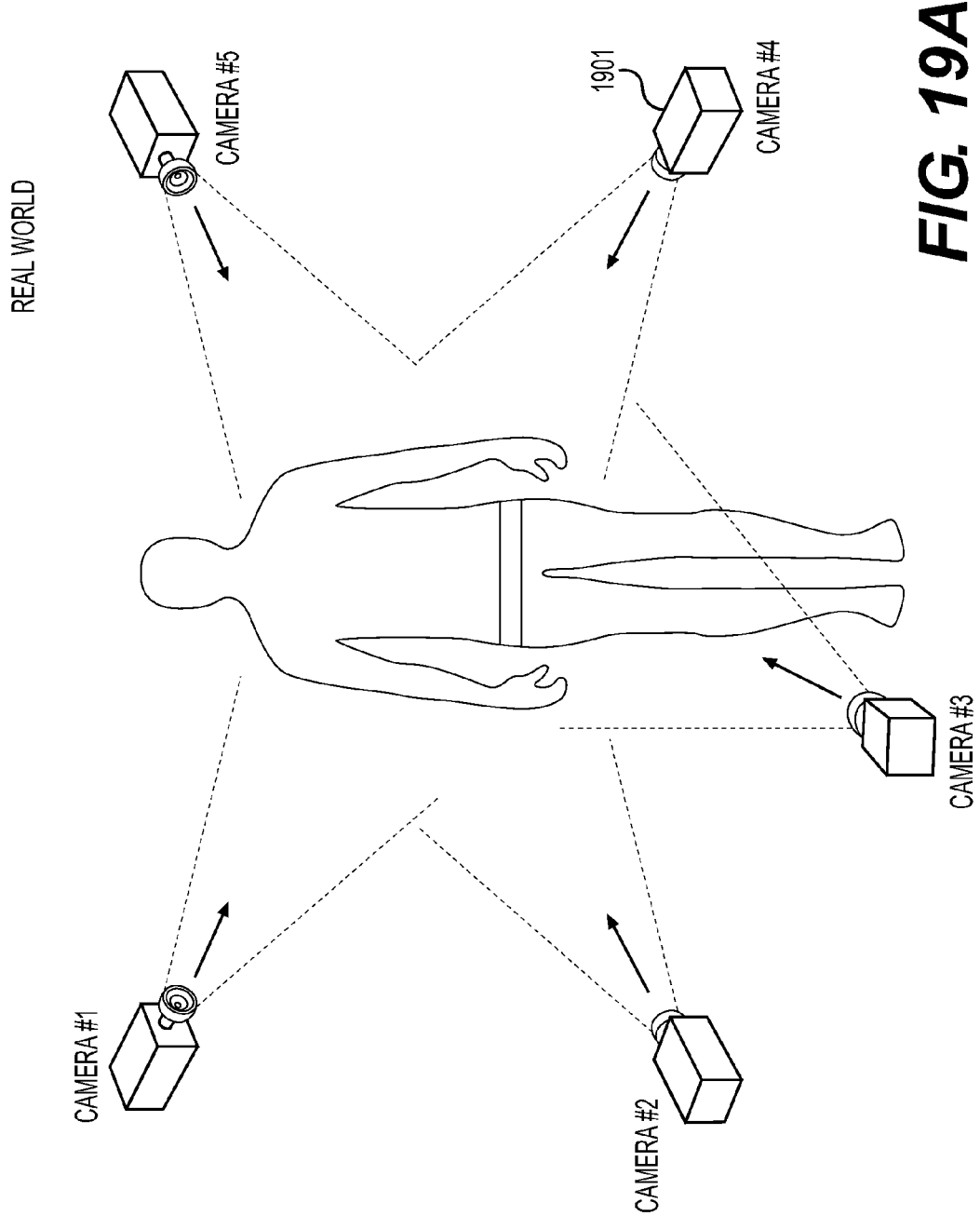
FIG. 19 shows a typical video camera layout, in accordance with embodiments of the invention.
Figure 20:
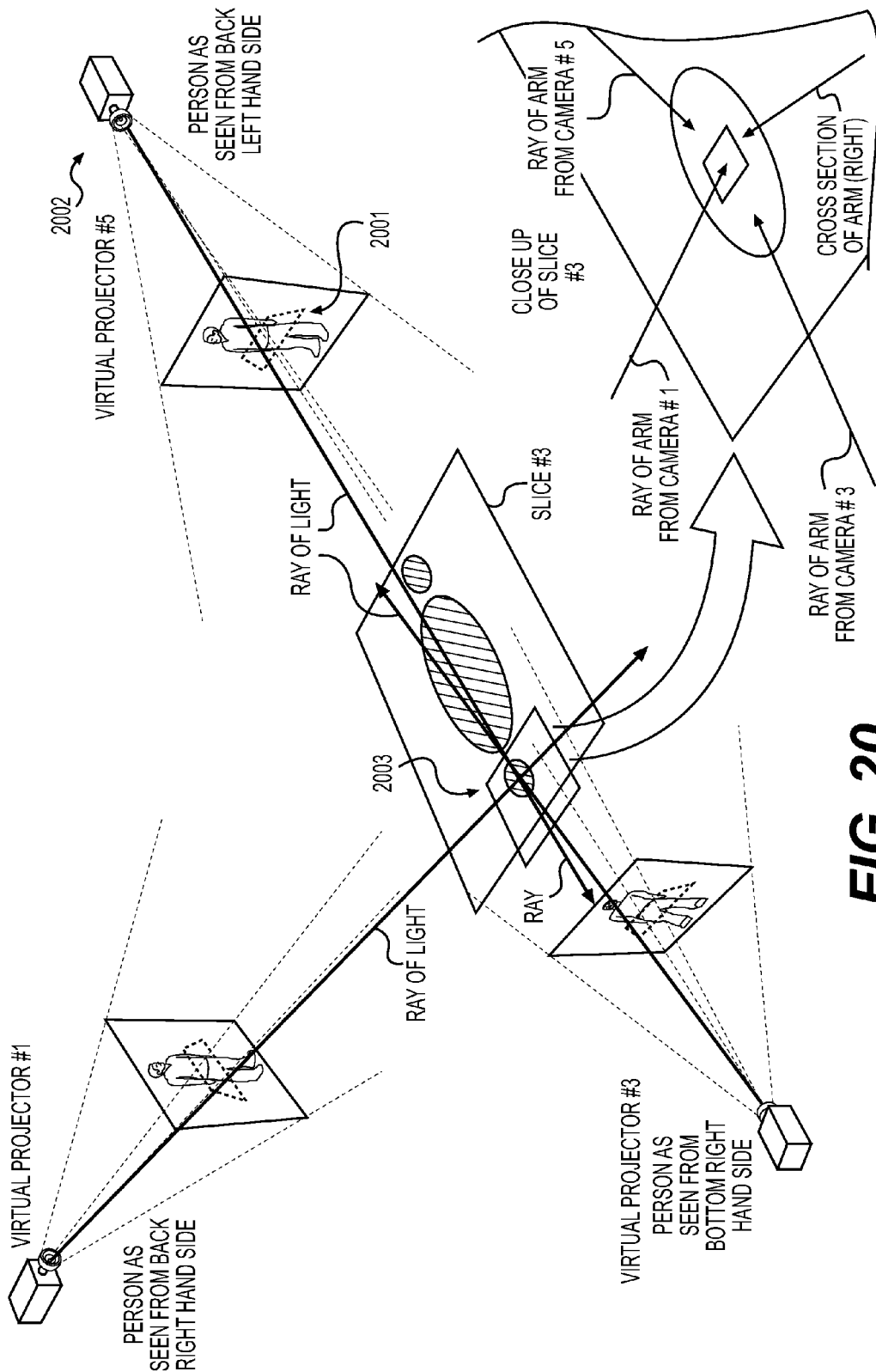
FIG. 20 depicts a close up view of projections onto a 2D polygon.

In a preferred embodiment, the 2D images may be projected into the 3D digital domain according to the technique as illustrated in FIG. 19. One or more virtual projectors are conceptualized in the 3D digital domain in a configuration analogous to the configuration of the one or more video cameras. One or more virtual 2D polygons are then placed into the data cloud. As shown in FIG. 19, in a primary embodiment of the invention, each virtual 2D polygon, also referred to as a "slice", is placed into the 3D digital domain as a horizontal plane, such that each slice is parallel to the next. In one embodiment of the invention, slices can be processed hardware capable of Direct-X capable of using Shader Version 1.4 or above, or similar graphics algorithm, as known in the art.

In one embodiment of the invention, the projected images have already undergone image processing techniques to subtract the background of the image, leaving only an image of the target object, prior to projecting the images for reconstruction. In an alternative embodiment of the invention, the images may be directly projected into the digital domain as they are received from the one or more video cameras. Subtraction of the background may occur after the images have been projected into the digital domain. In a preferred version of this embodiment, Shader Version 3.0 can be used to project slices, calculate lens distortion, and calculate background subtraction and projection in a single step, as mentioned above.

Each pixel on each 2D slice that is placed into the 3d projection environment executes a pixel shader program. This program accepts as input the ray of light emanating from all virtual projectors that shine on that pixel. The program then calculate if this pixel on the 2D surface is part of the object or part of the background by adding up how many of the projected rays come from objects and how many do not. If 90% or more of the rays belong to objects then that pixel probably belongs to an object. In the case that it belongs to an object the program can then check which ray had the most direct angle to the normal of the 2D slice. It may then average or interpolate between the most direct angles of rays to figure out the texture color (or shade of grey) that this particular part of the object has. In this way we not only determined if the pixel is part of an object in the real world space but we have determined the color or shade of the particular part. This process is calculated for each and every pixel on the 2D slice until the image on the slice looks like a cross section of the object. (in the case that the slice is intersecting the object) This intersection will also have the texture of the object.

Use of 2D slices according to this technique provides numerous advantages over those known in the art. First, this technique is resolution-independent: the clarity of each slice is determined by the resolution of the surface texture of the target object. Accordingly, the characteristics of each slice can be established dynamically to best fit with the characteristics of the target object. For example, if desired, the location of each slice can be placed at a different distance or orientation from another slice—it is not required that each polygon be placed parallel and equidistant from the next. Each polygon can be configured to represent a different "real world size"—for example, one polygon may represent a square meter or a square centimeter. The resolution of each polygon can be configured—each polygon may represent 100 pixels, or 1,000,000 pixels. The flexibility of this technique permits on-the-fly determinations regarding which pieces of the target are important, and which are not. For instance, during the tracking of human motion, it would be possible to examine the target human's fingers at a very high resolution, and the chest at a very low resolution. Using the dynamic resolution aspect of this technique, much higher resolutions are achievable than in a voxel-based approach.

Figure 4:
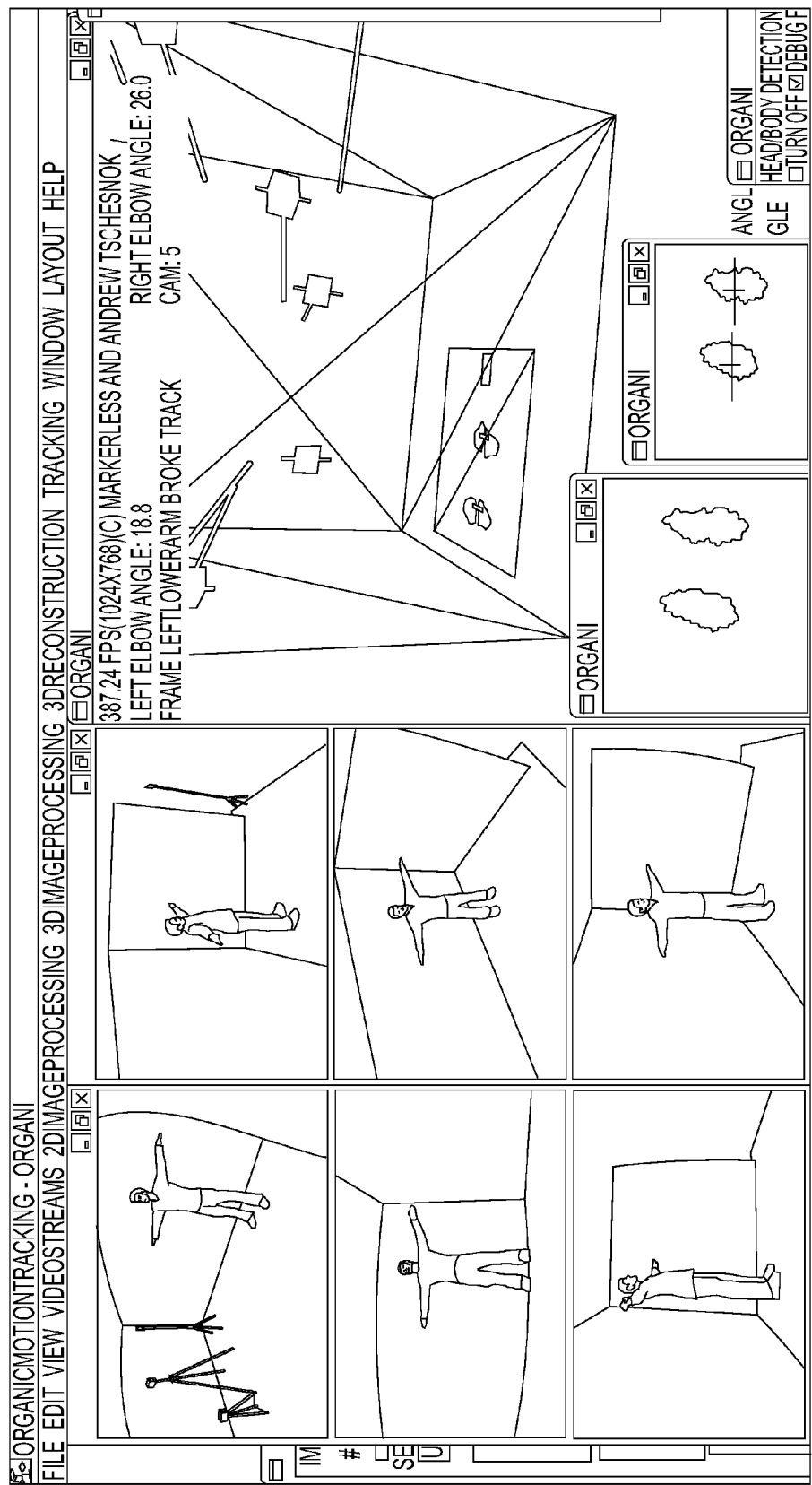
FIG. 4 depicts a 3D view on right showing a 2D polygon after all camera data has been projected on it (in this case the location of the Polygon is offering a cross section of the floor along the length of the subjects feet)

The method of the invention may further include performing conventional 2D image analysis on each slice in the 3D domain 2040. It is possible to use such conventional 2D image analysis to create 3D vector data of a target object. As shown in FIG. 4, creation of such vector data can be performed as follows: First, each slice is assessed for regions of continuity, commonly referred to as "blobs"—or image representation constructs herein. Once individual blobs or image representation constructs (used interchangeably herein) have been isolated, standard 2D curve fitting algorithms can be used to calculate the outline of the blob, also known in the art as 2D vector data. One such standard 2D curve fitting algorithm "fits" an ellipse to the blob, which provides the coordinates of the centerpoint of the blob within the slice, as well as x- and y-radii and an angle of rotation.

Once the 2D vector data has been calculated, the known properties of the slice can be applied to the 2D vector data to derive 3D vector data. Considering the position and orientation of each slice within the digital domain, it is possible to convert the XY coordinates of the ellipse on the 2D slice to XY coordinates in real world space (i.e. in millimeters relative to the origin point of the floor calibration board).

Figure 5:
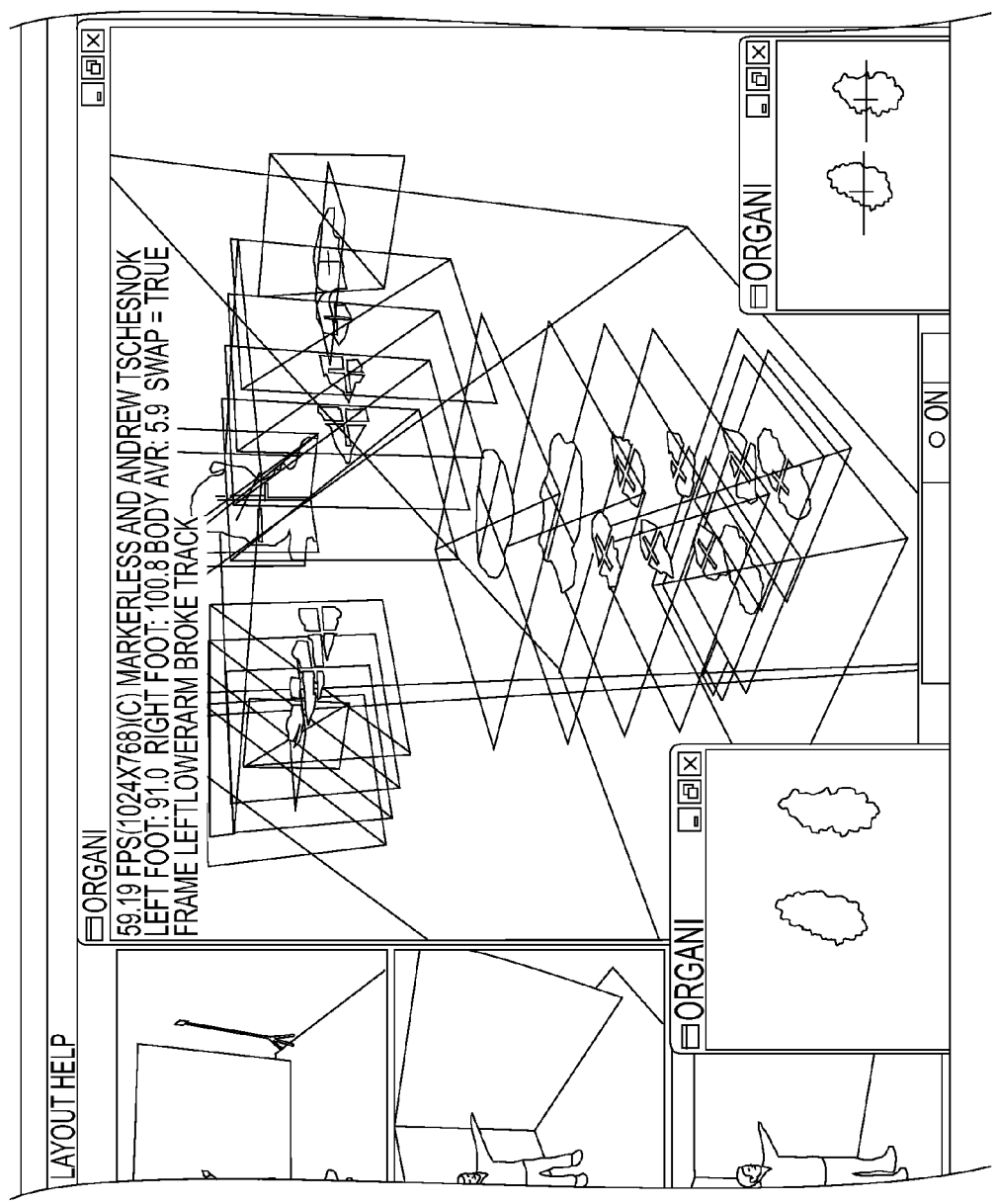
FIG. 5 shows the recursive use of 2D projected polygons to "examine" the space and find the full figure of a human subject.

The method of the invention may further include detecting the presence of a particular type of target based on the known characteristics of that particular target 2045. This detection is performed by inserting slices into the 3D digital domain at preselected locations in order to determine the presence or absence of expected regions of the target object. For example, in movie or game-related applications, it may be desirable to determine whether a detected target object is a human. As shown in FIG. 5, in one such embodiment of the invention, a human shape can be detected according to the following steps: First, a slice is placed at floor-height, and conventional 2D image analysis is performed as described above to search for blobs which have the general shape and size of a human foot. If human foot-shaped blobs are located within slice, another slice can be placed in the virtual space to look for ankle-shaped blobs. If ankle-shaped blobs are detected, the orientation of the human can be estimated, as the tips of the feet, i.e. the toes, face away from the ankles. Next, slices are placed at estimates of knee, hip, chest, and head height, and any blobs within those slices are identified. The orientation of the body, as estimated by analysis of the feet and the ankles, can be further clarified by examining the angle of the blobs representing the hips and chest within the applicable slices. Multiple slices can be placed in the vicinity of the head, with corresponding blob searches, to try to pinpoint the height of the person. Arms can be located by placing multiple slices on either side of the body and locating blobs. In one embodiment of the invention, "end cap" slices can be inserted which search of the edges of the target, such as the end of a hand, foot, or head. Having located each of these blobs, representing different pieces of the human body, it is possible to determine that a human being is being viewed, and the specific pose of that human. Of course, in alternative embodiments of the invention, the method could be used to locate an animal, or a car, or any other type of object with known characteristics.

Figure 6:
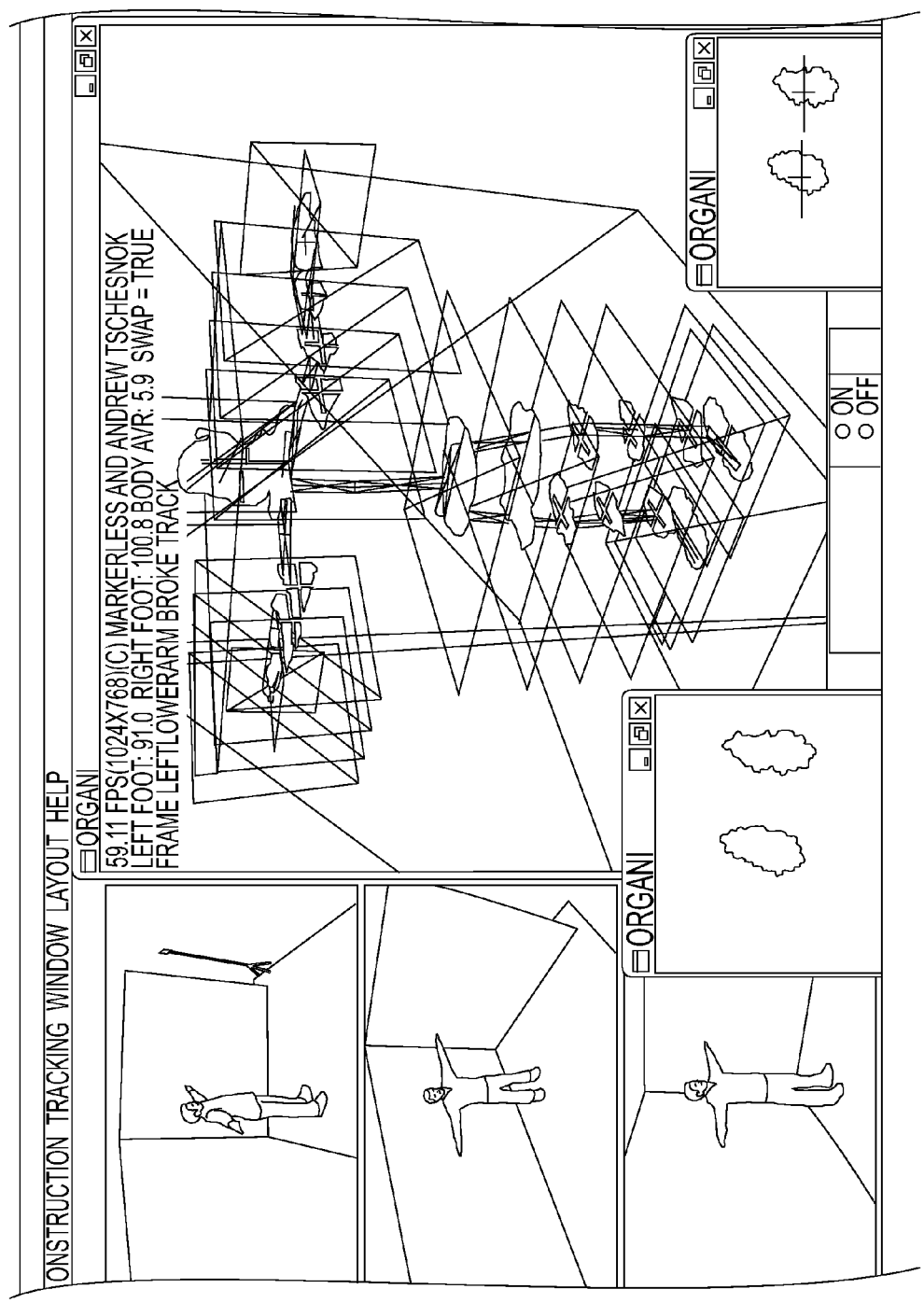
FIG. 6 depicts initial matching of a skeletal figure to the data generated by evaluating the 2D polygons.
Figure 7:
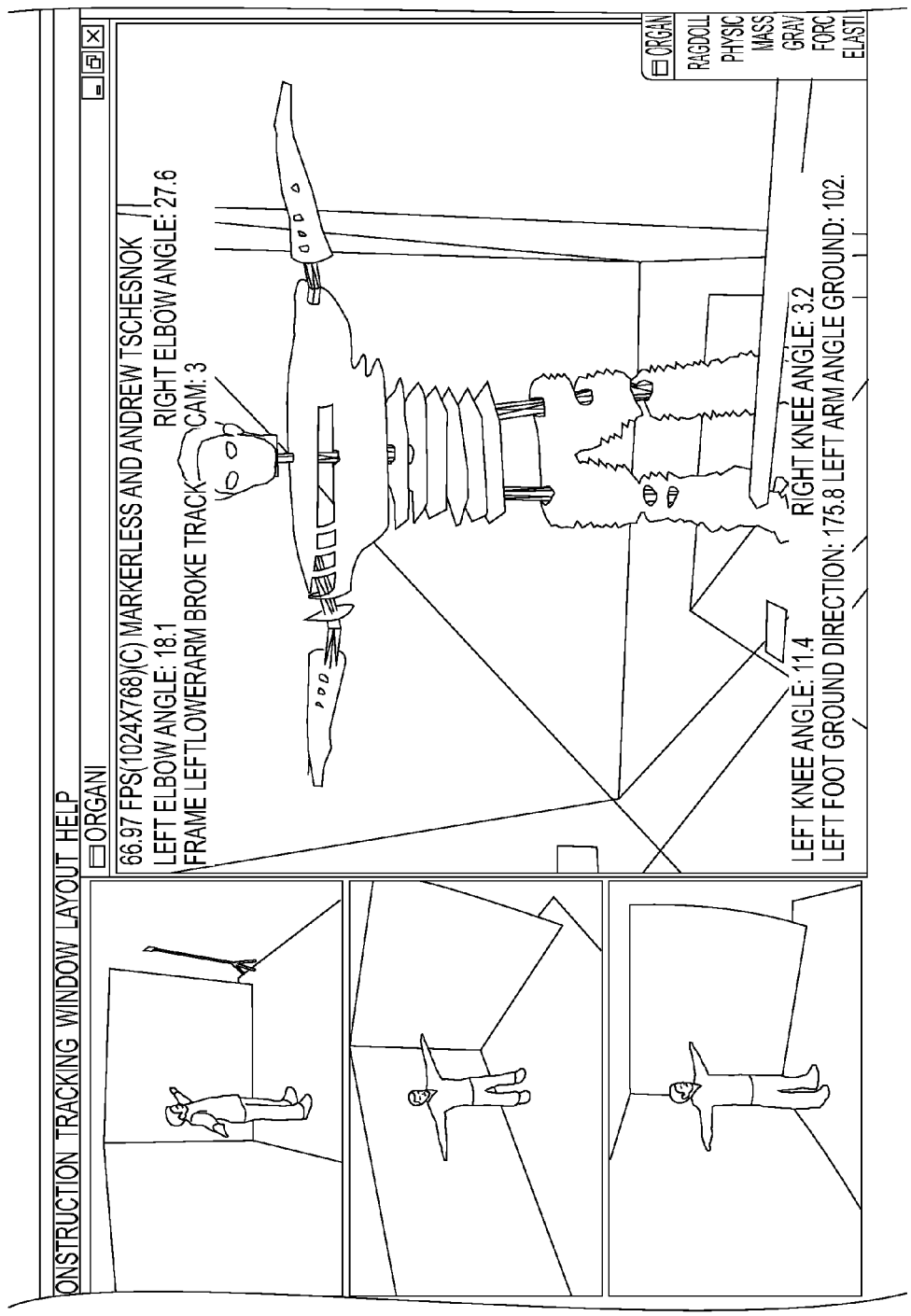
FIG. 7 shows 2D polygons after texture data has been projected onto them.
Figure 8:
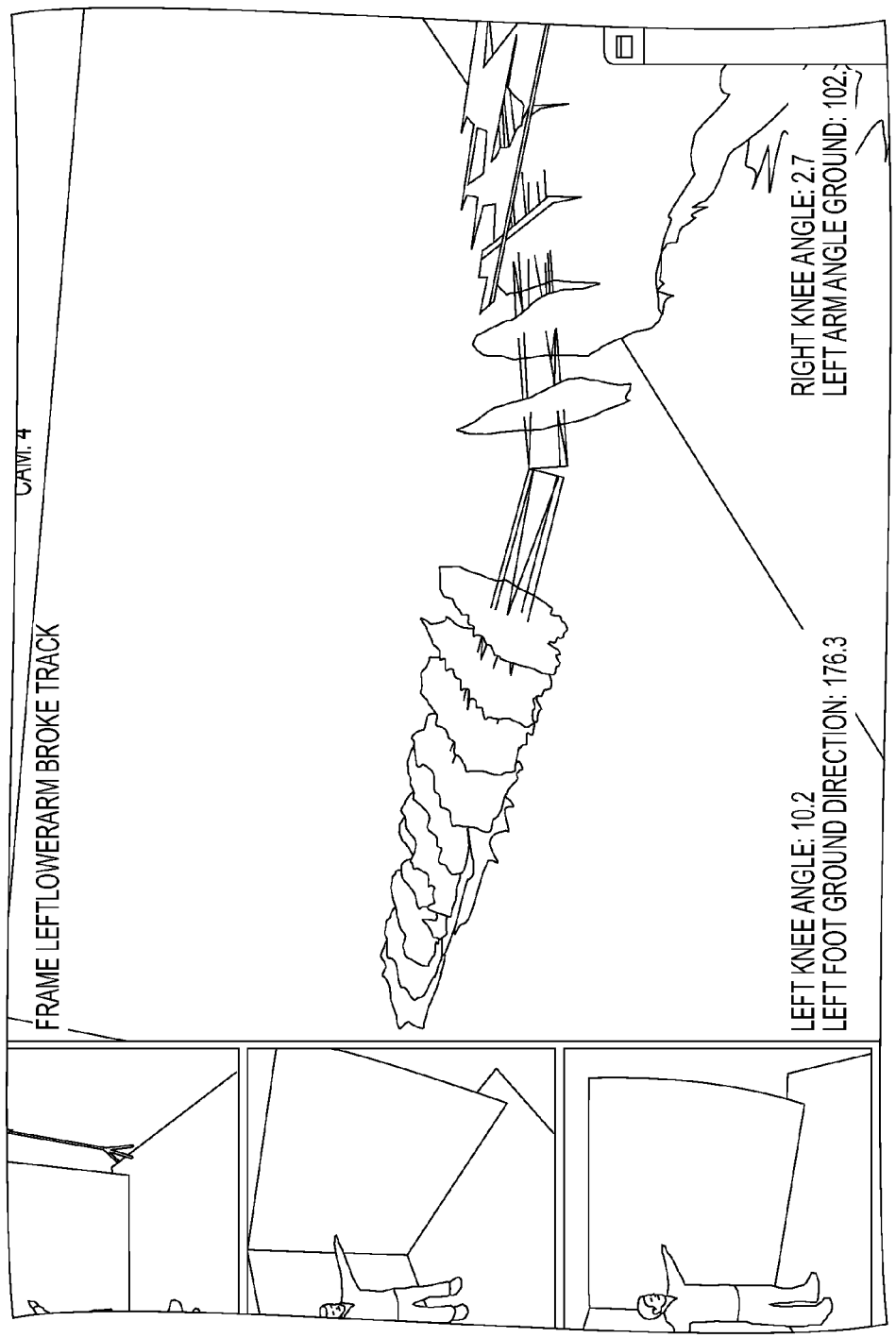
FIG. 8: depicts a close up of an arm being tracked using 2D polygons in local coordinate space.

The method of the invention can also include creating a "rag doll" virtual representation of the target object 2050. If a target has been detected in the space, virtual "bones" and a virtual "skeleton" can be fitted to the detected target based on physics, biology, mass, and inverse kinematics to create what looks like a floppy rag doll. As shown in FIG. 6, which depicts a rag doll representation of a human, the bones are inserted such that they are placed in the center of each slice and intersect the center coordinates of each blob.

Figure 17:
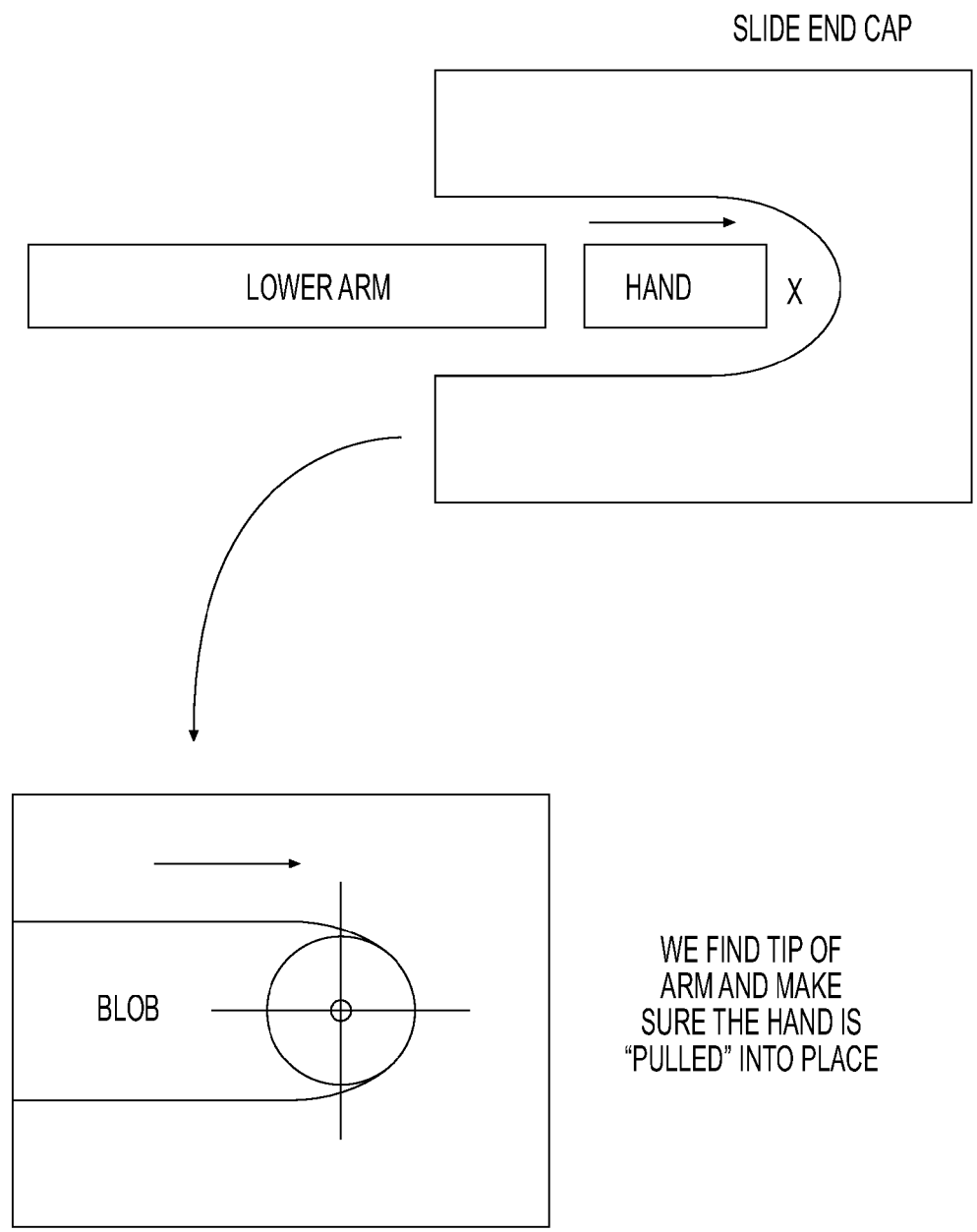
FIG. 17 shows how "end caps" can help properly position a skeletal figure being tracked.

Each bone is structured so that it travels continuously from one slice to the slices above and below it. As shown in FIG. 17, if end caps are inserted, such that, for example, the hands, feet, and head have been identified, these end caps can be used to set the boundaries of the rag doll and ensure that the rag doll is complete and stretched into the extremities.

Tracking/Texture

The method of the invention may also include tracking the target object 2055. This tracking can be performed by use of the rag doll created by inserting bones into the virtual space. Once a rag doll representation has been created, slices can be inserted for each body part, such that each slice is attached to the bones in fixed orientations.

Figure 15:
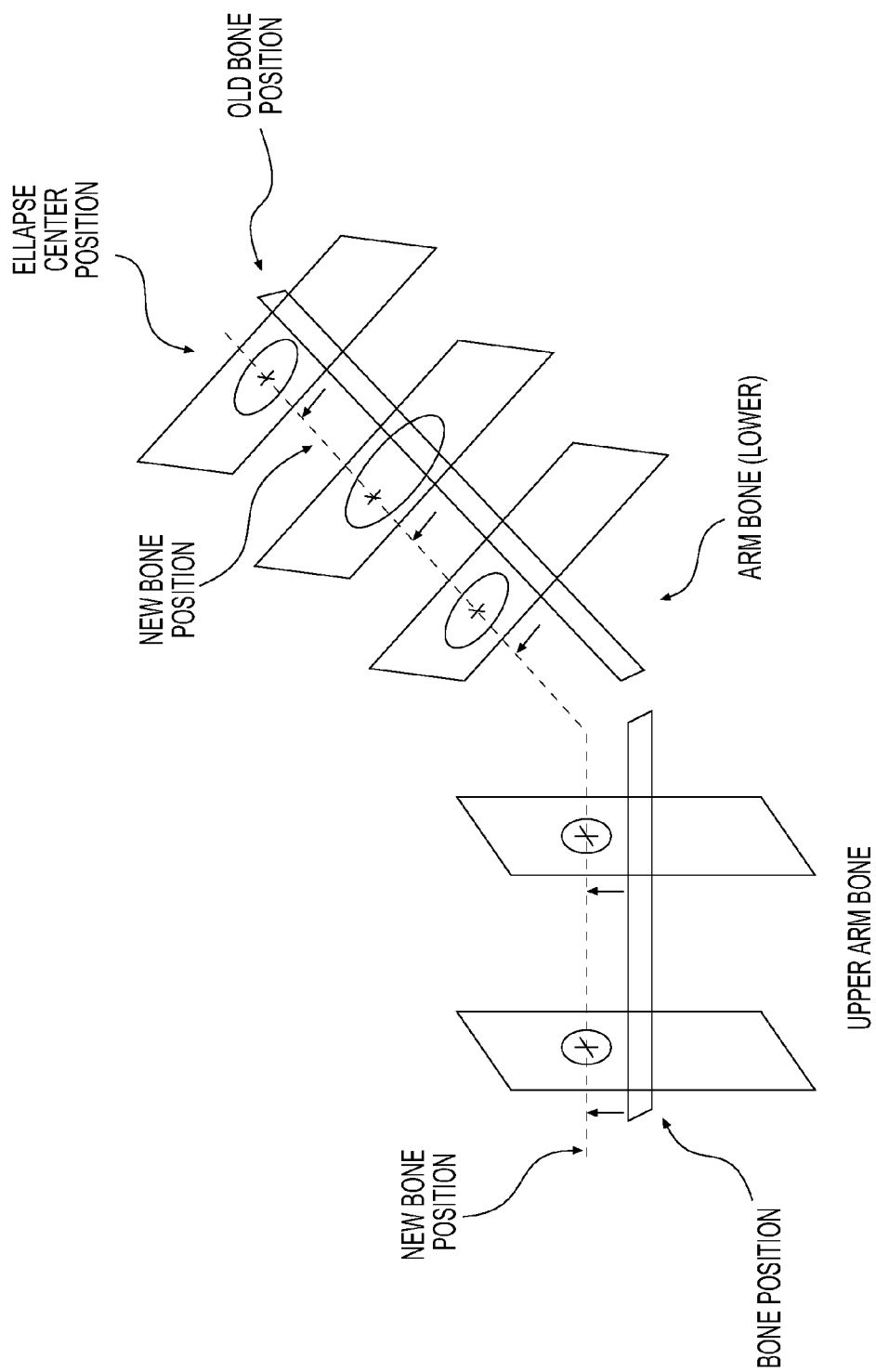
FIG. 15 shows how slices positioned local to the bones of a character being tracked can offer position information for the next time-step.
Figure 16:
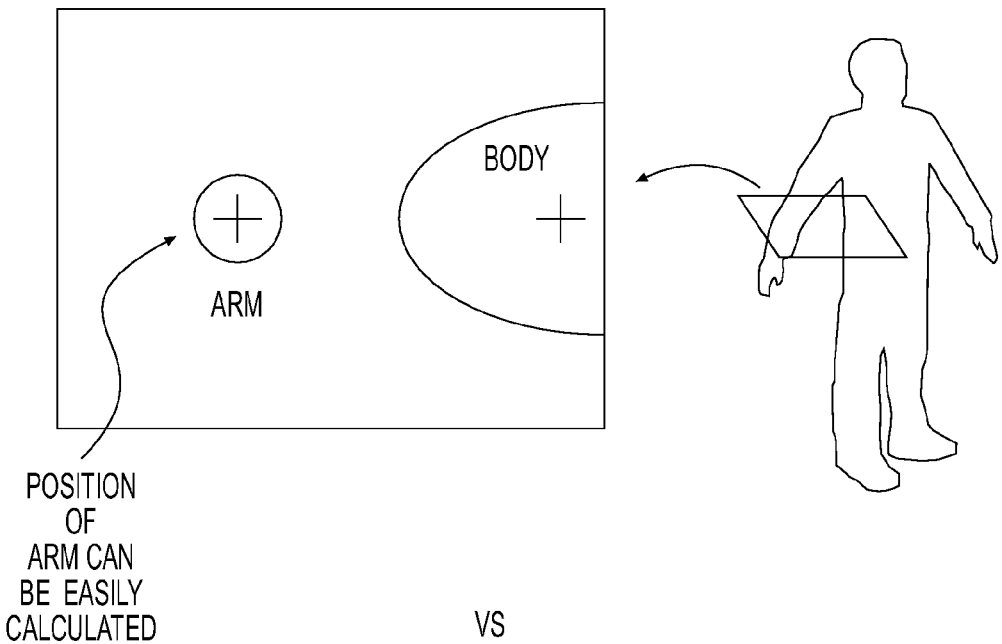
FIG. 16 shows how 2D slice analysis can be used to eliminate confusion complex scenes.
Figure 16:
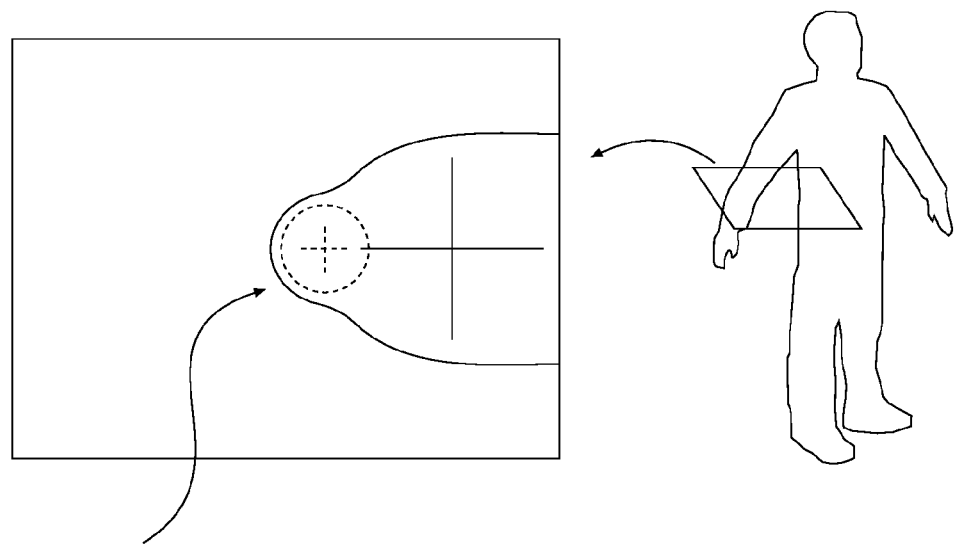

As illustrated in FIG. 15, the center point of each blob is created, and the discrepancy between the center point of each blob and the bone is determined. Forces can be applied in the virtual space to more closely align the center of the bone to the blob as it intersects the slice. This process can be repeated as desired to make the rag doll track the target. As the target object moves, the cameras record and update the projections they project into the 3D simulation. In this manner, the rag doll can be animated and made to follow the real world target, as if the real world target is a puppet master and the rag doll a mime which follows the master's projected data in a 3D computer simulation.

The method may also include additional steps which can be followed to determine whether there is interference between parts of the same target object 2060. For example, when tracking a human arm, a problem can arise when the arm moves close to the body. At some point, two separate blobs, one belonging to the cross-section of the arm and one to the cross-section of the body, may come so close together that they form a single blob, making it difficult to determine which object belongs where. The rag doll can be used to test for and resolve this situation. Since the rag doll is moving over time in the same way the real person is moving, it can be assumed that the rag doll data closely resembles the real data. The diameter of the rag doll's arm and the relative position of the rag doll's body are both known. It can then be assessed whether the small blob of the arm resides within the larger blob of the body.

Figure 9:
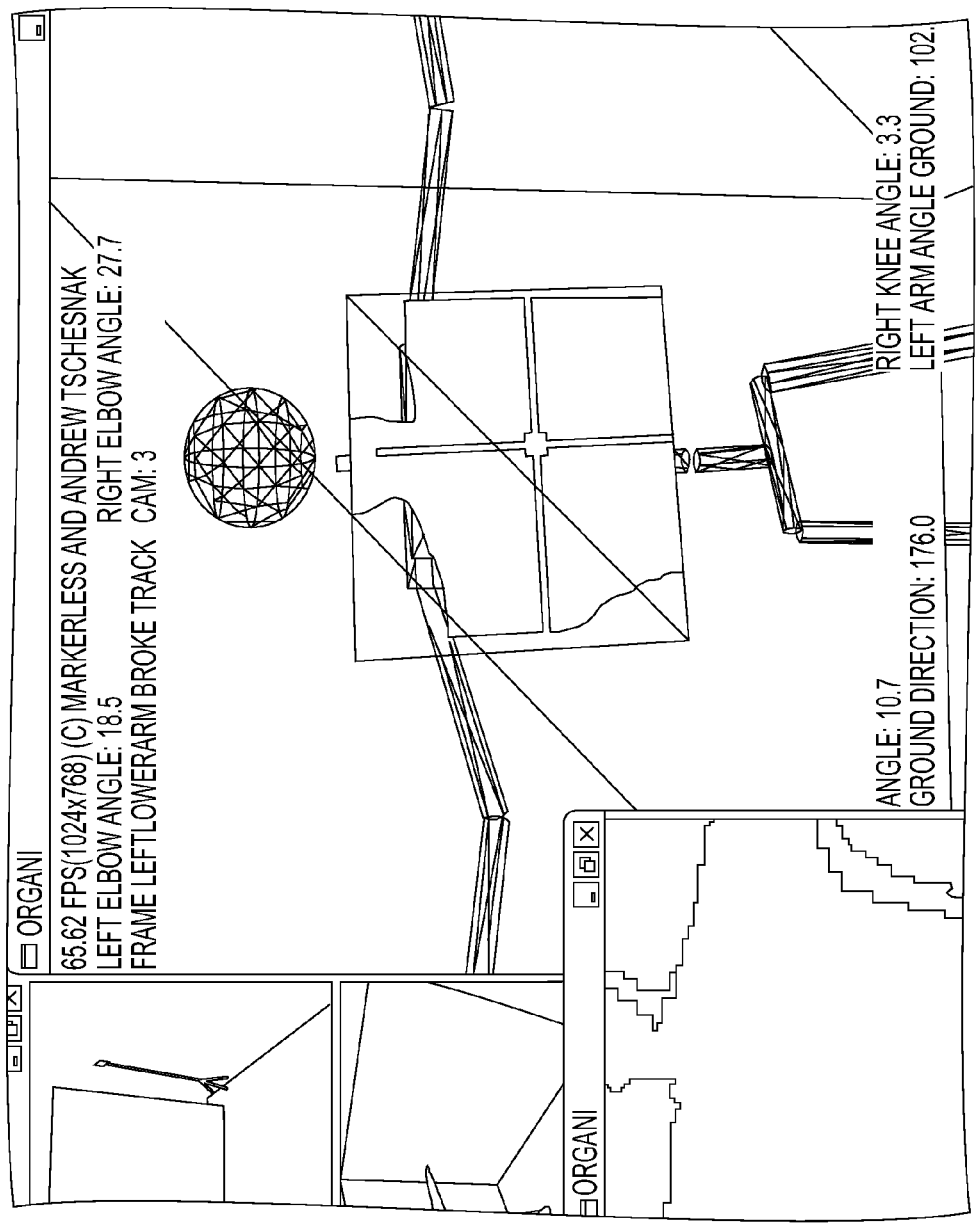
FIG. 9 shows how a texture can be projected onto a 2D polygon.
Figure 10:
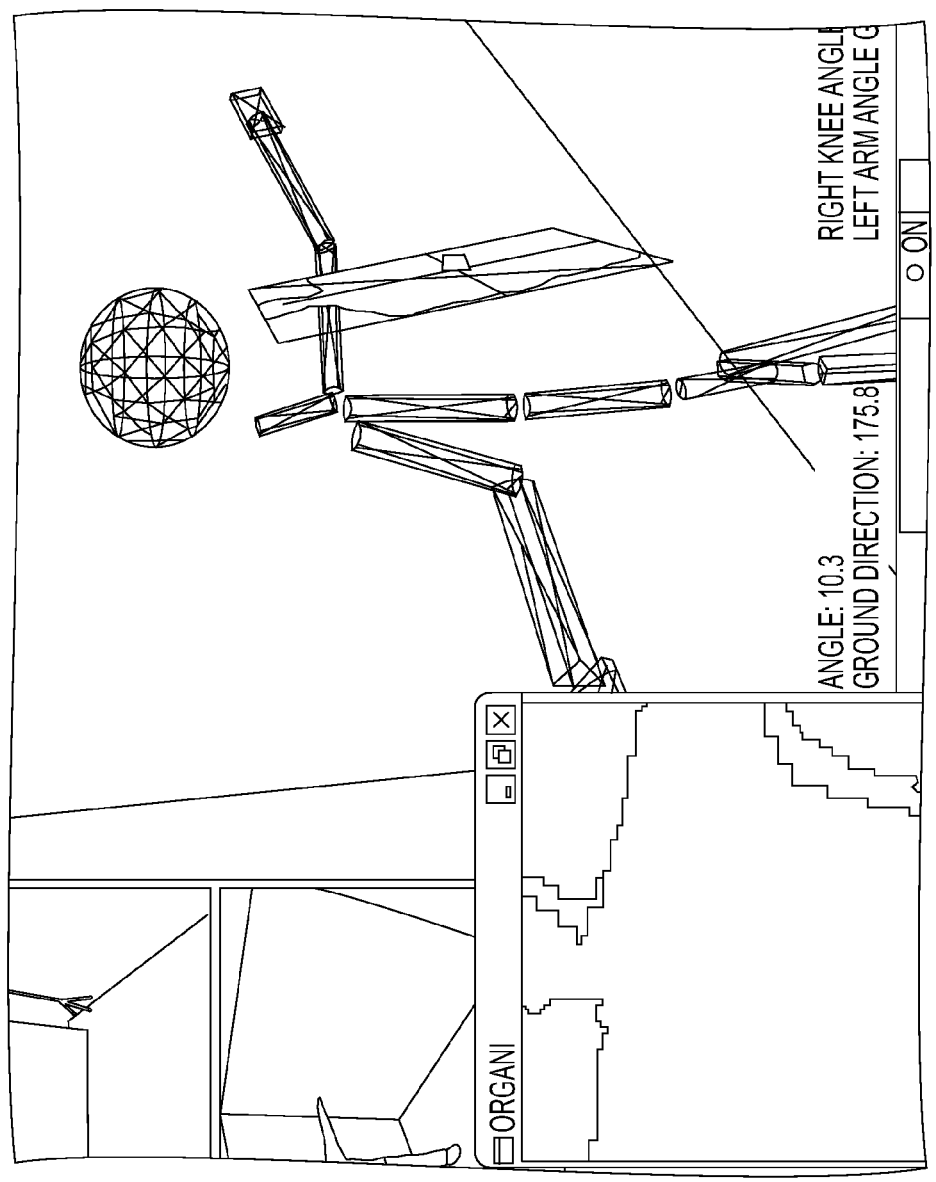
FIG. 10 depicts another viewpoint of the projected texture from FIG. 9.

The method may further include detecting the surface texture of the target object. When the rag doll closely approximates the position and orientation of the target object, slices can be placed on the target as surface sections, rather than cross sections. For example, as shown in FIG. 9, a slice could be placed on the chest of the rag doll. A blob would then be fitted to the chest as described above. Since the position of the slice is known relative to all of the cameras, the actual projected texture can be determined and rendered from a blend of the best-positioned camera projectors. This gives the rag doll not only the outline of the actual target, but also the "look" and texture of the target. Slices can be placed all around the outline of the rag doll to give it the appearance of the target all over.

The method of the present invention also permits detection 2060 and tracking 2065 of textures on 2D surfaces during animation, for example, according to the following steps: First, a reference image is captured of one or more slices at the beginning of the animation sequence. Then, for each slice, a new image is captured as the animation progresses. The new image for each slice is compared to the reference image for that particular slice, determining by what X and Y values the two textures differ in position and by what angle they have rotated. Applying the known properties of the slice to these X, Y, and angle values, the actual 3D position of the texture can be calculated. This permits a calculation of the difference between the initial 3D position of the texture, from the reference image, and the current 3D position of the texture from the new image. This offset can be used to add forces to the Rag Doll to further refine its position, which can achieve a high degree of accuracy exceeding that of even marker-based motion capture systems.

In certain embodiments of the invention, all of the steps of the method can be performed by software running on a processor-based device, such as a computer. The instructions associated with such steps may be stored in a memory within, or coupled to, the processor-based device. Examples of such memory may include, for example, RAM, ROM, SDRAM, EEPROM, had drives, flash drives, floppy drives, and optical media. In alternative embodiments, one or more of the steps can be performed manually, by a person.

Uses of the Systems and Methods

Use of the present invention is cost-effective and highly efficient. Existing GPUs often include hardwired features for the projection of shadows into virtual spaces. In one embodiment of the invention, this dedicated hardware can be used as-is to perform the reconstruction techniques of the present invention to use the hardware in a completely new manner. Use of dedicated hardware, as opposed to computer-based techniques, can accelerate the tracking process by orders of magnitude.

In addition to general 3D tracking, the systems and methods described here in can be used to solve many problems in computer vision which have been solved in 2D, but not yet 3D. For example, as noted above, the present invention permits the tracking of specific textures in 3D using 2D image processing techniques. This effectively provides 3D image processing at the cost of 2D image processing techniques. Many other 2D techniques can be extrapolated in the same manner.

The systems and methods of the present invention are also very scalable. A system could be setup using hundreds of cameras, and every individual slice could be rendered by selecting the cameras which are most relevant to it based on its position in the space. This would allow for the ability to outfit a large facility with cameras and track objects over vast amounts of spaces.

The systems and methods disclosed herein can be used for numerous applications, including but not limited to:

A visual aid in a karaoke system

Analysis of the swing and body movement of athletes, such as tennis players, golf players, skiers, and snowboarders, to improve performance and to prevent injuries Animation of 3D cartoons or virtual characters on television or in movies A component of a visual-based security system Research and development of products by studying the movements of subjects while using particular products A component of human/computer user interfaces A component of a visual simulation or training system Evaluation of human body shape, size or vital signs, such as breathing mechanics A component of a public entertainment experience Fitness or exercise evaluation or recommendation system A component of a physical rehabilitation system, or clinical motion analysis tool A component of a virtual reality visualization system What has been described and illustrated herein is a preferred embodiment of the invention along with some of its variations. The terms, descriptions and figures used herein are set forth by way of illustration only and are not meant as limitations. Those skilled in the art will recognize that many variations are possible within the spirit and scope of the invention, which is intended to be defined by the following claims, in which all terms are meant in their broadest reasonable sense unless otherwise indicated therein.

What is claimed is:

1. A method for creating a 3D representation of a target object in a 3D digital domain, the method comprising:
   (i) placing a target object within a background space;
   (ii) directing at least two video cameras at said target object;
   (iii) acquiring a total image from each of said video cameras directed at the target object;
   (iv) subtracting said background space from each of said total images to produce a target image of the target object;
   (v) performing internal calibration of each of said video cameras;
   (vi) performing relative external calibration of two or more of said video cameras; and
   (vii) reconstructing a 3D image of said target object via projections of one or more of said target images into said 3D digital domain, wherein said image reconstruction comprises:
      (a) conceptualizing one or more virtual projectors in said 3D digital domain in a configuration analogous to the direction, and from the position, of said video cameras, and with the lens properties of said video cameras;
      (b) inserting one or more virtual 2D slices into said 3D digital domain;
      (c) comparing each of said virtual 2D slices to each of said projected images;
      (d) incrementing a counter each time one of said projected images intersects one of said virtual 2D slices;
      (e) comparing said counter to the number of said video cameras; and
      (f) deciding whether said target object is considered to exist at the location of said virtual 2D slices in said 3D digital domain.

2. The method of claim 1, wherein said image reconstruction further comprises dynamically configuring the characteristics of each of said virtual 2D slices to best fit the characteristics of said target object.

3. The method of claim 1, wherein each of said virtual 2D slices are inserted into said 3D digital domain such that each of said virtual 2D slices is parallel to every other of said virtual 2D slices.

4. A method for creating a 3D representation of a target object in a 3D digital domain, the method comprising:
(i) placing a target object within a background space;
(ii) directing at least two video cameras at said target object;
(iii) acquiring a total image from each of said video cameras directed at the target object;
(iv) subtracting said background space from each of said total images to produce a target image of the target object;
(v) performing internal calibration of each of said video cameras;
(vi) performing relative external calibration of two or more of said video cameras;
(vii) reconstructing a 3D image of said target object via projections of one or more of said target images into said 3D digital domain, wherein said image reconstruction via projections of one or more of said target images into said 3D digital domain comprises projecting said target images acquired from each of said video cameras into said 3D digital domain in the direction, and from the position, of said video camera, and with the lens properties of said video camera; and
(viii) tracking said target object in said 3D digital domain, wherein said tracking of said target object comprises:
  (1) performing 2D image analysis on each of said acquired images projected into said 3D digital domain; wherein the 2D image analysis comprises:
    (a) assessing each virtual 2D slice for one or more image representation constructs;
    (b) calculating the outline of each of said image representation constructs;
    (c) fitting an ellipse to each of said image representation constructs;
    (d) calculating the centerpoint, x- and y-radii, and an angle of rotation for each of said image representation constructs; and
    (e) applying the known properties of each virtual 2D slice to each of said image representation constructs located within said virtual 2D slice to generate real-world coordinates of each of said image representation constructs;
  (2) detecting the presence of said target object based on the known characteristics of said target object; and
  (3) creating a rag doll virtual representation of said target object in said 3D digital domain.

5. A method for creating a 3D representation of a target object in a 3D digital domain, the method comprising:
(i) placing a target object within a background space;
(ii) directing at least two video cameras at said target object;
(iii) acquiring a total image from each of said video cameras directed at the target object;
(iv) subtracting said background space from each of said total images to produce a target image of the target object;
(v) performing internal calibration of each of said video cameras;
(vi) performing relative external calibration of two or more of said video cameras;
(vii) reconstructing a 3D image of said target object via projections of one or more of said target images into said 3D digital domain, wherein said image reconstruction via projections of one or more of said target images into said 3D digital domain comprises projecting said target images acquired from each of said video cameras into said 3D digital domain in the direction, and from the position, of said video camera, and with the lens properties of said video camera; and
(viii) tracking said target object in said 3D digital domain, wherein said tracking of said target object comprises:
  (1) performing 2D image analysis on each of said acquired images projected into said 3D digital domain;
  (2) detecting the presence of said target object based on the known characteristics of said target object, wherein detection of the target object comprises:
    (a) conceptualizing one or more virtual projectors in said 3D digital domain in a configuration analogous to the configuration of said one or more video cameras;
    (b) inserting one or more virtual 2D slices into said 3D digital domain at one or more locations predetermined based on the known characteristics of said target object;
    (c) comparing each of said virtual 2D slices to each of said projected images;
    (d) incrementing a counter each time one of said projected images intersects one of said virtual 2D slices;
    (e) comparing said counter to the number of said one or more video cameras;
    (f) deciding whether said target object is considered to exist at the location of said virtual 2D slices in said 3D digital domain;
    (g) assessing each virtual 2D slice for one or more image representation constructs;
    (h) calculating the outline of each of said image representation constructs;
    (i) fitting an ellipse to each of said image representation constructs;
    (j) calculating the centerpoint, x- and y-radii, and an angle of rotation for each of said image representation constructs; and
    (k) applying the known properties of each virtual 2D slice to each of said image representation constructs located within said virtual 2D slice to generate real-world coordinates of each of said image representation constructs; and
  (3) creating a rag doll virtual representation of said target object in said 3D digital domain.

6. The method of claim 5, wherein said target object is a human, and the method further comprises at least two of:
(a) inserting a virtual 2D slice parallel to the floor and at floor height;
(b) inserting a virtual 2D slice parallel to the floor and at ankle height;
(c) inserting a virtual 2D slice parallel to the floor and at knee height;
(d) inserting a virtual 2D slice parallel to the floor and at hip height;
(e) inserting a virtual 2D slice parallel to the floor and at chest height; and
(f) inserting one or more virtual 2D slices parallel to the floor and at head height.

7. The method of claim 6, further comprising determining the orientation of said human by analyzing the relationship between one or more image representation constructs located within said virtual 2D slice parallel to the floor and at floor height and one or more image representation constructs located within said 2D slice parallel to the floor and at ankle height.

8. The method of claim 7, wherein the determination of the orientation of said human further comprises analyzing the relationship between one or more image representation constructs located within said virtual 2D slice parallel to the floor and at hip height and one or more image representation constructs located within said 2D slice parallel to the floor and at chest height.

9. The method of claim 8, further comprising determining the height of said human.

10. The method of claim 9, further comprising inserting one or more virtual 2D slices as end caps, such that the edge of said target object can be determined.

* * * * *